(12) United States Patent
Naito et al.

(10) Patent No.: US 11,956,538 B2
(45) Date of Patent: Apr. 9, 2024

(54) IMAGE CAPTURING APPARATUS THAT PERFORMS BLUR CORRECTION AND METHOD OF CONTROLLING SAME

(71) Applicant: CANON KABUSHIKI KAISHA, Tokyo (JP)

(72) Inventors: Go Naito, Kanagawa (JP); Ryuichiro Yasuda, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 9 days.

(21) Appl. No.: 17/816,840

(22) Filed: Aug. 2, 2022

(65) Prior Publication Data
US 2023/0046830 A1 Feb. 16, 2023

(30) Foreign Application Priority Data

Aug. 16, 2021 (JP) .................. 2021-132368

(51) Int. Cl.
H04N 23/68 (2023.01)

(52) U.S. Cl.
CPC ....... H04N 23/683 (2023.01); H04N 23/6811 (2023.01)

(58) Field of Classification Search
None
See application file for complete search history.

(56) References Cited

U.S. PATENT DOCUMENTS

| 2012/0249830 A1* | 10/2012 | Tsubaki | G06T 5/008 |
| | | | 348/E5.037 |
| 2015/0235103 A1* | 8/2015 | Komatsu | G06T 7/593 |
| | | | 382/195 |
| 2018/0336688 A1* | 11/2018 | Narita | G06T 7/194 |

FOREIGN PATENT DOCUMENTS

| JP | 2012105254 A | * | 5/2012 | .......... H04N 5/2628 |
| JP | 2018014601 A | * | 1/2018 | |
| WO | WO-2013024703 A1 | * | 2/2013 | .............. G06T 7/20 |

OTHER PUBLICATIONS

English translation of JP-2012105254-A, Kusaka, 2012 (Year: 2012).*
English translation of JP-2018014601-A, Takayanagi, 2018 (Year: 2018).*
English translation of WO-2013024703-A1, Kuzutani, 2013 (Year: 2013).*
Orly Liba et al., Handheld Mobile Photography in Very Low Light—22 pgs arXiv:1910.11336v1 [cs.CV] Oct. 24, 2019 Cited in Specification in paragraphs [0004][0005][0141].

* cited by examiner

Primary Examiner — James M Hannett
(74) Attorney, Agent, or Firm — Cowan, Liebowitz & Latman, P.C.

(57) ABSTRACT

An image capturing apparatus that is capable of accurately acquiring motion vectors according to a photographing environment and performing blur correction with high accuracy. The image capturing apparatus includes an image sensor, and a photometry unit that performs photometry of a photographing environment. A motion vector calculation section calculates motion vectors based on images acquired by the image sensor. A camera system controller calculates a reliability of the motion vectors. A photographing condition determination section determines photographing conditions for consecutively photographing a plurality of images by the image sensor, according to a photometry result and the calculated reliability.

17 Claims, 14 Drawing Sheets

IMAGE CAPTURING APPARATUS THAT PERFORMS BLUR CORRECTION AND METHOD OF CONTROLLING SAME

BACKGROUND OF THE INVENTION

Field of the Invention

The present invention relates to an image capturing apparatus and a method of controlling the same, and more particularly to an image capturing apparatus that performs blur correction when photographing by driving an image sensor and a photographing optical system, and a method of controlling the same.

Description of the Related Art

In recent years, many of image sensors and photographing optical systems are each equipped with a blur correction mechanism in accordance with improvement of performance of image capturing apparatuses. With this blur correction mechanism, when a user performs photographing using an image capturing apparatus in a handheld state, it is possible to reduce the influence of a handshake on a photographed image.

Further, the readout speed of the image sensor has been increased in accordance with the improvement of performance of the image capturing apparatuses, and a technique of correcting and reducing an image blur due to a handshake by aligning and combining a plurality of consecutive images is known. However, this technique has a problem that when the exposure time period of each image is shortened to reduce a handshake in each of the plurality of images to be combined, the SN ratio of each image is lowered and noise is increased.

To solve this problem, "Handheld Mobile Photography in Very Low Light", by Orly Liba, and other 13 persons, [online], Oct. 24, 2019, [searched Jul. 5, 2021], Internet <URL: https://arxiv.org/list/cs.CV/1910?skip=500&show25> discloses a technique of determining the exposure time period of each image based on a balance between motion magnitudes (whether due to handshake or moving objects) and noise.

However, the technique disclosed in "Handheld Mobile Photography in Very Low Light" has a problem that it is impossible to accurately acquire positional displacement information (hereinafter referred to as the "motion vector") of each image, used when performing image alignment and combination, depending on a photographing environment, and as a result, it is impossible to perform blur correction with high accuracy.

SUMMARY OF THE INVENTION

The present invention provides an image capturing apparatus that is capable of accurately acquiring motion vectors according to a photographing environment and performing blur correction with high accuracy, and a method of controlling the same.

In a first aspect of the present invention, there is provided an image capturing apparatus that includes an image sensor, and a photometry unit that performs photometry of a photographing environment, including at least one processor, and a memory coupled to the at least one processor, the memory having instructions that, when executed by the processor, perform the operations as: a motion vector calculation section configured to calculate motion vectors based on images acquired by the image sensor, a reliability calculation unit configured to calculate a reliability of the motion vectors, and a photographing condition determination section configured to determine photographing conditions for consecutively photographing a plurality of images using the image sensor, according to a photometry result obtained by the photometry unit and the reliability calculated by the reliability calculation unit.

In a second aspect of the present invention, there is provided an image capturing apparatus that includes an image sensor, including at least one processor, and a memory coupled to the at least one processor, the memory having instructions that, when executed by the processor, perform the operations as: a translational shake detection section configured to detect a translational shake of the image capturing apparatus to output a speed signal, a photographing magnification acquisition section configured to acquire a photographing magnification of a photographing optical system that causes light from an object to form an image on an imaging surface of the image sensor, a total exposure time determination section configured to determine a total exposure time period over which a plurality of images are to be consecutively acquired by the image sensor, an imaging surface translational shake amount prediction section configured to predict an imaging surface translational shake amount of the image sensor, which is to occur over the total exposure time period, based on the speed signal and the photographing magnification, and a photographing condition determination section configured to determine an exposure time period of each of frames of the images to be consecutively photographed and the number of the frames of the images to be consecutively photographed, based on the total exposure time period and the imaging surface translational shake amount.

According to the present invention, it is possible to accurately acquire motion vectors according to a photographing environment and perform blur correction with high accuracy.

Further features of the present invention will become apparent from the following description of exemplary embodiments (with reference to the attached drawings).

DESCRIPTION OF THE EMBODIMENTS

The present invention will now be described in detail below with reference to the accompanying drawings showing embodiments thereof.

Preferred embodiments of the present invention will be described in detail below with reference to the accompanying drawings.

Figure 1A:
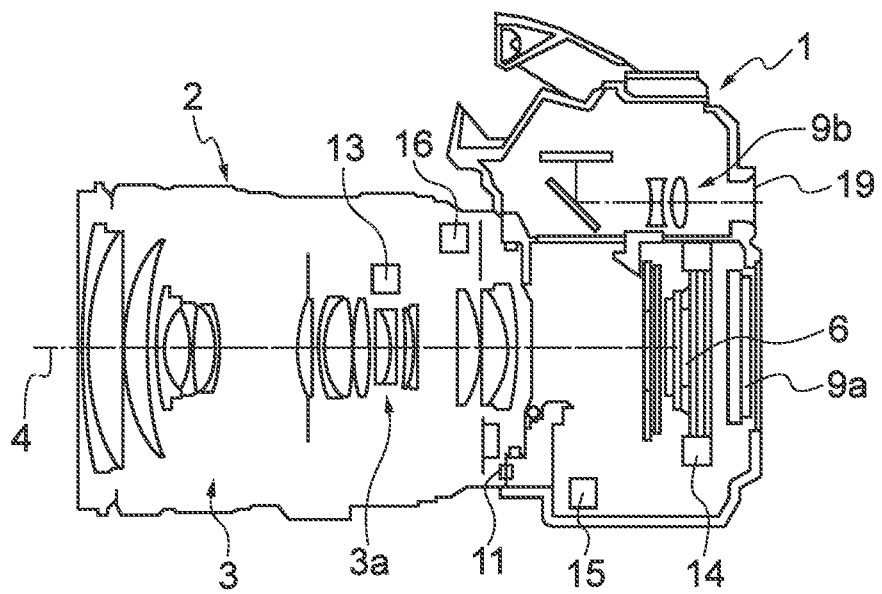
FIGS. 1A and 1B are a central cross-sectional view of an image capturing apparatus according to a first embodiment of the present invention and a block diagram showing an electrical configuration of the image capturing apparatus.
Figure 1B:
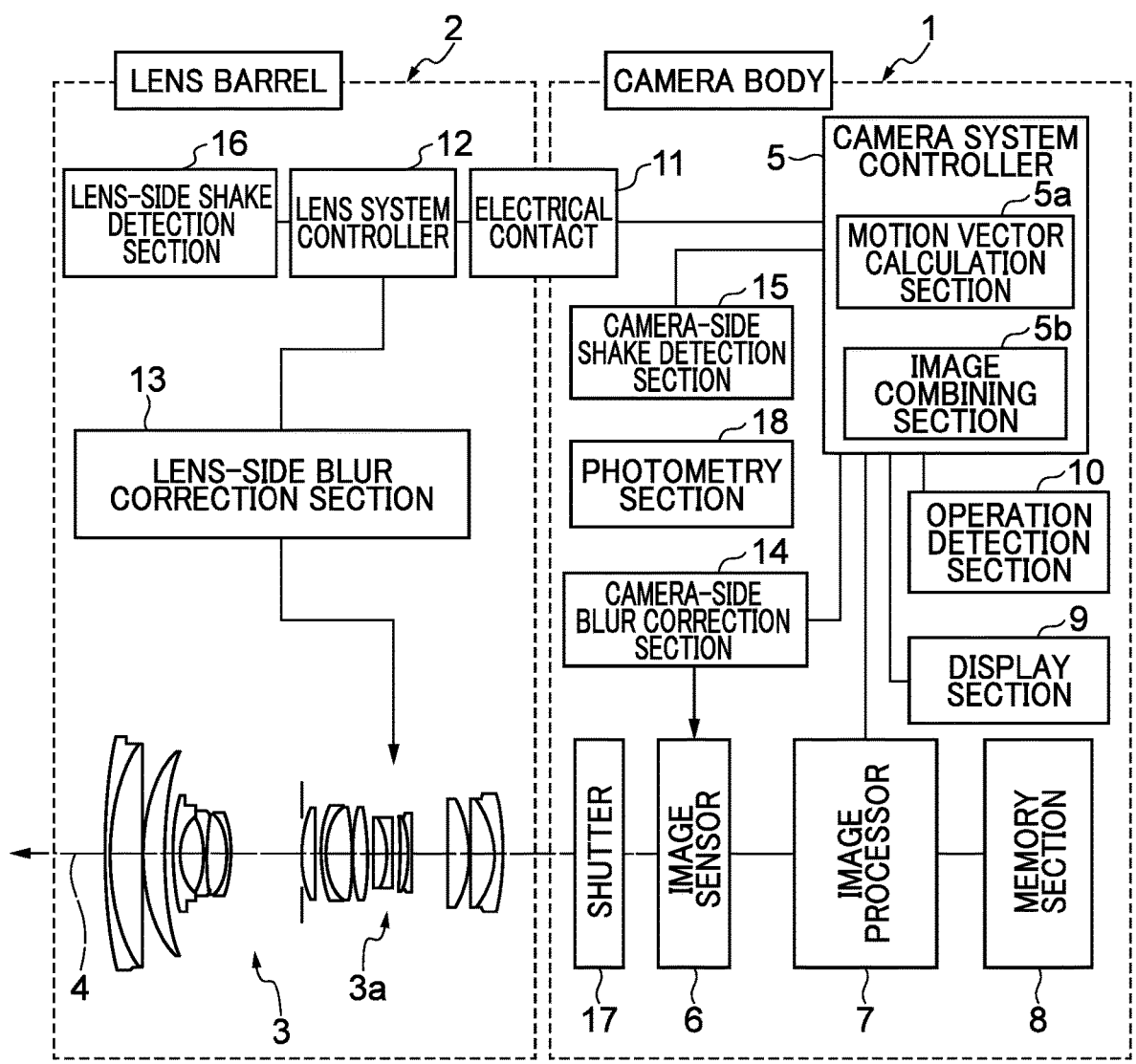

The following description will be given of an image capturing apparatus comprised of a camera body 1 and a lens barrel 2 attached to the camera body 1 in a first embodiment of the present invention with reference to FIGS. 1A to 9. FIG. 1A is a central cross-sectional view of the image capturing apparatus according to the present embodiment, and FIG. 1B is a block diagram showing an electrical configuration of the image capturing apparatus. The same reference numerals in FIGS. 1A and 1B denote the same components, respectively.

As shown in FIGS. 1A and 1B, the lens barrel 2 is attached to the camera body 1. When the lens barrel 2 is attached, the camera body 1 and the lens barrel 2 are enabled to communicate with each other via an electrical contact 11.

The lens barrel 2 includes a photographing optical system 3 that is arranged on an optical axis 4 and formed by a plurality of lenses including a blur correction lens 3a which performs blur correction, a lens system controller 12, a lens-side blur correction section 13, and a lens-side shake detection section 16.

The camera body 1 includes a camera system controller 5, an image sensor 6, an image processor 7, a memory section 8, a display section 9, an operation detection section 10, a camera-side blur correction section 14, a camera-side shake detection section 15, a shutter 17, a photometry section 18, and a finder 19.

The camera system controller 5 includes a motion vector calculation section 5a that calculates motion vectors and an image combining section 5b that aligns the positions of a plurality of acquired images and combining the images.

The display section 9 is formed by a rear display device 9a arranged on a rear side of the camera body 1 and an EVF (electronic viewfinder) 9b provided in the finder 19.

The operation detection section 10 detects a signal output from operation means including a shutter release button, not shown, and so forth.

The lens-side blur correction section 13 drives the blur correction lens 3a that performs blur correction on a plane orthogonal to the optical axis 4.

The camera-side blur correction section 14 drives the image sensor 6 on a plane orthogonal to the optical axis 4.

The camera-side shake detection section 15 is provided in the camera body 1 and detects a shake amount of the image sensor 6.

The lens-side shake detection section 16 is provided in the lens barrel 2 and detects a shake amount of the photographing optical system 3.

The shutter 17 is provided in front of the image sensor 6.

The photometry section 18 is provided in the camera body 1 and performs photometry of a photographing environment.

The image capturing apparatus according to the present embodiment has image capturing means, image processing means, recording and reproducing means, and control means.

The image capturing means includes the photographing optical system 3 and the image sensor 6.

The image processing means includes the image processor 7.

The recording and reproducing means includes the memory section 8 and the display section 9 (the rear display device 9a and the EVF 9b).

The control means includes the camera system controller 5, the operation detection section 10, the camera-side shake detection section 15, the camera-side blur correction section 14, the lens system controller 12, the lens-side shake detection section 16, and the lens-side blur correction section 13.

Note that the lens system controller 12 can also drive not only the blur correction lens 3a, but also a focus lens, a diaphragm, and so forth, none of which are shown, using driving means, not shown.

The camera-side shake detection section 15 and the lens-side shake detection section 16 can detect an angular shake with respect to the optical axis 4, which is applied to the image capturing apparatus, and realize this detection using a vibration gyroscope or the like. The camera-side blur correction section 14 and the lens-side blur correction section 13 drive the image sensor 6 and the blur correction lens 3a on a plane orthogonal to the optical axis 4, respectively, based on an amount of an angular shake detected by the camera-side shake detection section 15 and the lens-side shake detection section 16.

Further, the camera-side shake detection section 15 and the lens-side shake detection section 16 may be provided with an acceleration sensor or the like and configured to be enabled to detect a translational shake applied to the image capturing apparatus. In this case, the camera-side blur correction section 14 and the lens-side blur correction section 13 drive the image sensor 6 and the blur correction lens 3a on a plane orthogonal to the optical axis 4 based on detected angular shake and translational shake, respectively.

The above-mentioned image capturing means is an optical processing system that causes light from an object to form an image on an imaging surface of the image sensor 6 through the photographing optical system 3. A focus evaluation amount/proper exposure amount can be obtained from the image sensor 6, and hence the photographing optical system 3 is adjusted based on a signal indicative of the focus evaluation amount/proper exposure amount, whereby a proper amount of object light is exposed to the image sensor 6 and an object image is formed at or in the vicinity of the image sensor 6.

The image processor 7 internally incorporates an analog-to-digital converter, a white balance adjustment circuit, a gamma correction circuit, an interpolation calculation circuit, and so forth, and is capable of generating a still image and a moving image for recording. Color interpolation processing means is provided in this image processor 7 and generates a color image by performing color interpolation (demosaicing) from Bayer array signals. Further, the image processor 7 performs compression of a still image, or a moving image and sound, for recording, using a predetermined method.

The memory section 8 includes an actual storage section formed e.g. by a ROM, a RAM, an HDD, or the like. The camera system controller 5 controls the output to the recording section of the memory section 8 and the display of an image to be presented to a user on the display section 9.

The camera system controller 5 generates a timing signal and the like for image capturing in response to an external operation and outputs the generated timing signal and the like to each of the image capturing means, the image processing means, and the recording and reproducing means, as required, to thereby control these means. For example, when pressing of the shutter release button, not shown, is detected by the operation detection section 10, the camera system controller 5 controls driving of the image sensor 6, the operation of the image processor 7, and so forth. Further, the camera system controller 5 controls states of segments of the image capturing apparatus that displays information using the display section 9. Further, the rear display device 9a is implemented by a touch panel, and may serve as both the display section 9 and the operation detection section 10.

The operation of the control means for adjusting the image capturing means will be described.

The camera system controller 5 is connected to the image processor 7, acquires signals output from the image sensor 6 via the image processor 7, and determines the proper focus position and diaphragm position based on the acquired signals. The camera system controller 5 sends a command to the lens system controller 12 via the electrical contact 11, and the lens system controller 12 properly controls focus lens-driving means and diaphragm driving means, neither of which is shown, based on this command. Further, in a mode for performing blur correction, the camera system controller 5 properly controls the camera-side blur correction section 14 based on a signal obtained from the camera-side shake detection section 15. Similarly, the lens system controller 12 properly controls the lens-side blur correction section 13 based on a signal obtained from the lens-side shake detection section 16.

Specifically, the control means performs the following basic blur control operation for the image capturing means.

First, the camera system controller 5 and the lens system controller 12 receive, from the camera-side shake detection section 15 and the lens-side shake detection section 16, shake signals (an angular shake and a translational shake) detected by these shake detection sections, respectively. The camera system controller 5 and the lens system controller 12 calculate respective driving amounts of the image sensor 6 and the blur correction lens 3a for correcting an image blur, based on the received detection results. After that, the camera system controller 5 and the lens system controller 12 deliver the calculated driving amounts to the camera-side blur correction section 14 and the lens-side blur correction section 13 as command values to drive the image sensor 6 and the blur correction lens 3a, respectively.

In the present embodiment, in addition to the above-described basic blur control operation, a blur control operation on the image capturing means is changed according to the resolution level of the photographing optical system 3 and the resolution level of the image sensor 6, and further, the photographing conditions, such as a focal length and a shutter speed. Details of the control method will be described hereinafter.

Further, as described above, the camera system controller 5 and the lens system controller 12 control the respective components of the camera body 1 and the lens barrel 2 according to a user operation performed on operation means, not shown, which are provided on the camera body 1 and the lens barrel 2. With this, it is possible to photograph a still image and a moving image.

Further, the image capturing apparatus according to the present embodiment is also capable of performing an image-combining blur correction operation for obtaining a blur correction effect by aligning and combining images consecutively photographed (acquired) by the image sensor 6.

As the basic image-combining blur correction operation, first, the camera system controller 5 acquires images consecutively photographed by the image sensor 6 via the image processor 7.

Then, the camera system controller 5 controls the motion vector calculation section 5a to calculate position displacement information (motion vectors) between the images acquired via the image processor 7.

Further, the camera system controller 5 controls the image combining section 5b to perform position alignment between the images acquired via the image processor 7 based on the motion vectors calculated by the motion vector calculation section 5a and combine the images.

With this basic image-combining blur correction operation, it is possible to obtain an image photographed over a pseudo extended exposure time period in a blur reduced state.

Next, position alignment image synthesis in the present embodiment will be described with reference to FIG. 2.

Figure 2:
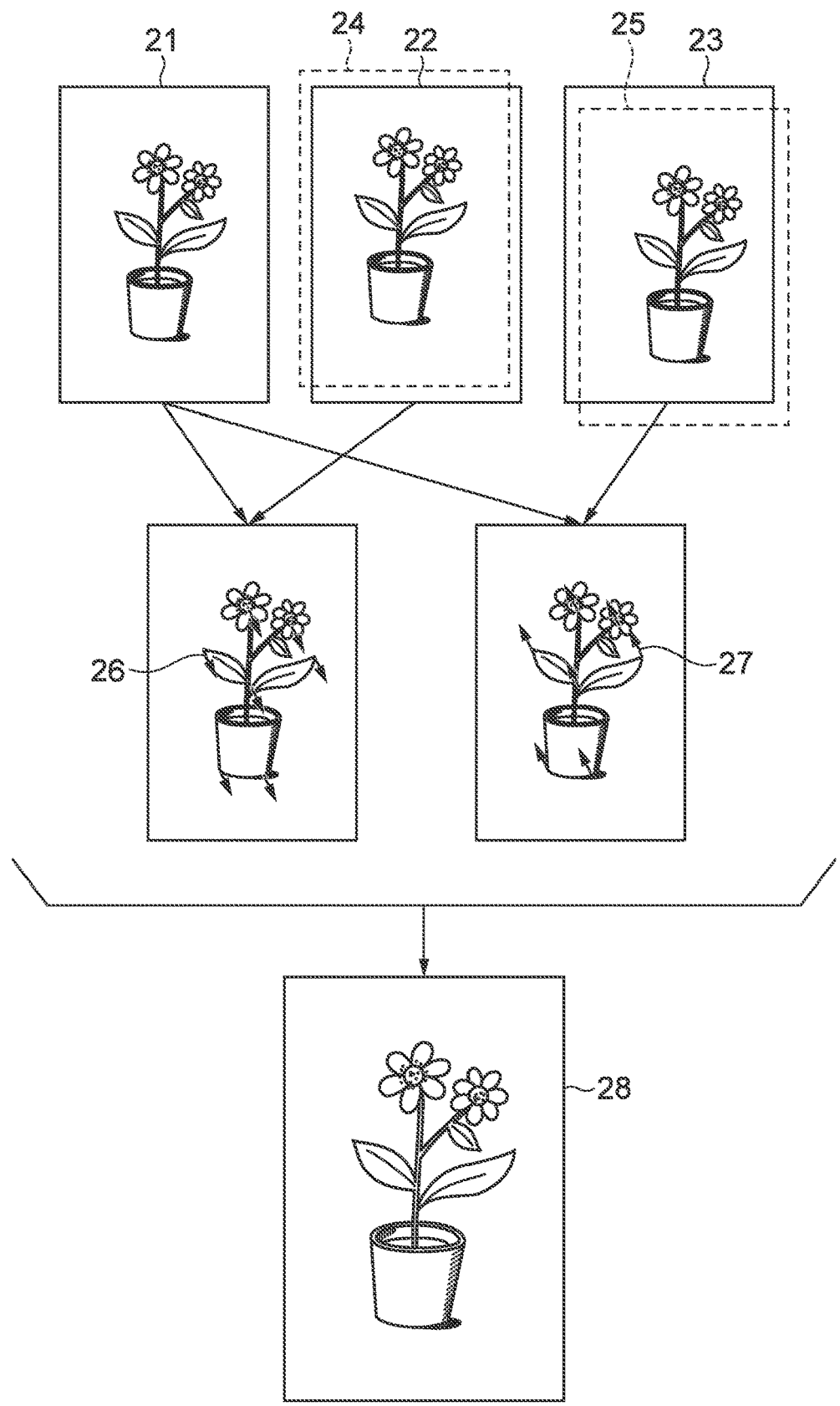
FIG. 2 is a diagram useful in explaining image alignment and combination in the first embodiment of the present invention.

Referring to FIG. 2, an image 21 is a first image of images consecutively photographed by the image sensor 6, and further, images 22 and 23 are second and third images photographed after the image 21. Further, a broken line 24 indicates an angle of view of the first image 21 compared with an angle of view of the second image 22, and a broken line 25 indicates the angle of view of the first image 21 compared with an angle of view of the third image 23.

A motion vector 26 is calculated by the motion vector calculation section 5a using the image 21 and the image 22, and a motion vector 27 is calculated by the motion vector calculation section 5a using the image 21 and the image 23.

An image 28 is an image obtained by the image combining section 5b aligning the positions of the images 21 to 23 based on the motion vectors 26 and 27 and then combining the images 21 to 23.

As illustrated in FIG. 2, by combining the images 21 to 23, which have been consecutively acquired, after aligning the positions thereof as described above, an image is generated which is equivalent to an image obtained by performing photographing over an apparent (i.e. seeming) exposure time period required to photograph the three images. Further, in the image 28, a blur can be more suppressed than in an image obtained by performing one photographing operation over an exposure time period required to photograph the three images of the images 21 to 23, and hence it is possible to obtain a picture at a long apparent shutter speed in a blur suppressed state.

Although in FIG. 2, the image 28 which is single is generated by calculating the motion vectors 26 and 27 from the three images 21 to 23, and performing image alignment and combination of the images 21 to 23 based on the motion vectors 26 and 27, the number of images to be used for the image alignment and combination is not limited to three. That is, the minimum number of images to be used for the image alignment and combination is two, and a larger number of images may be combined.

Next, the method of calculating the motion vectors 26 and 27 in FIG. 2 will be described.

The motion vector is calculated by extracting feature points from two images and calculating movement amounts of the extracted feature points between the two images. In doing this, as the method of extracting feature points, there may be mentioned a method of detecting edges (corners), a method of detecting feature points using luminance gradients, and so forth. Further, as the method of calculating a movement amount of the feature point, there may be mentioned a method of calculating a movement amount by performing matching between two images and determining a distance between each corresponding two feature points. Thus, by using two images, it is possible to calculate an amount indicating a degree of movement of the image capturing apparatus between respective time points at which the two images are acquired, as a motion vector.

Note that as shown in FIG. 2, if a plurality of feature points are included in an image, basically, a plurality of motion vectors are detected. Further, there are a case where a maximum amount detected as a motion vector is determined in advance, and a case where the total amount of motion vectors is set for each of areas so as to prevent detected motion vectors from concentrating in part of the screen. Basically, if feature points can be detected from images and matching of the feature points between the images can be determined, the motion vectors corresponding in number to the number of the detected feature points are calculated.

Further, all motion vectors do not necessarily indicate the same direction and magnitude. For example, in a case where an object itself has moved, the movement amount can vary with each feature point, i.e. the motion vectors can be different. On the other hand, in cases where two images are aligned, except where the images are affine-transformed and combined, the image alignment and combination is basically performed by a method of uniformly moving the whole screen and combining the images. Therefore, in the present embodiment, the image alignment and combination is performed by determining a representative motion vector from a plurality of motion vectors, and assuming that the direction and magnitude of the representative motion vector correspond to the position displacement amount between the two images.

The representative motion vector is determined from variation in the direction and magnitude of the plurality of detected motion vectors. Further, it is possible to determine, based on the variation, a reliability of each motion vector, i.e., a degree of matching in the direction and magnitude between each motion vector and the representative motion vector. In the present embodiment, as the number of ones of the detected motion vectors, which substantially match the representative motion vector in the direction and magnitude, is larger, the reliability of the motion vectors is determined to be higher, and as the number of the ones which substantially match the representative motion vector in the direction and magnitude is smaller, the reliability of the motion vectors is determined to be lower.

Next, examples of a photographing environment in which the reliability of acquired motion vectors is low will be described, and a method of changing photographing conditions, developing parameters, and image processing so as to increase the reliability of the motion vectors for these examples will be described with reference to FIGS. 3A to 3C.

Figure 3A:
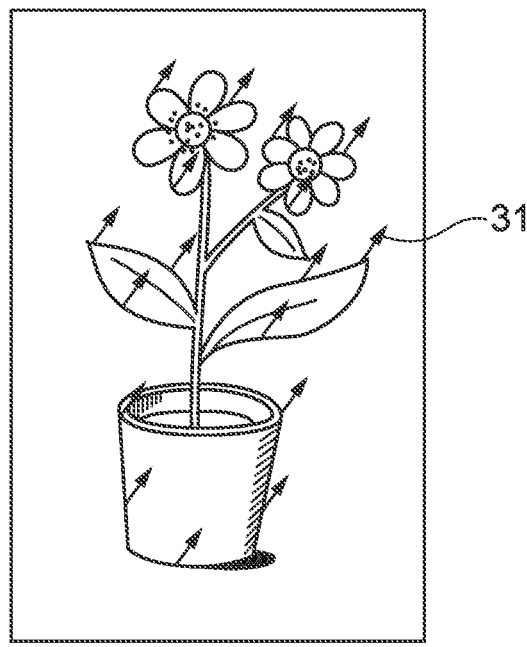
FIGS. 3A to 3C are diagrams useful in explaining reliability of motion vectors.
Figure 3B:
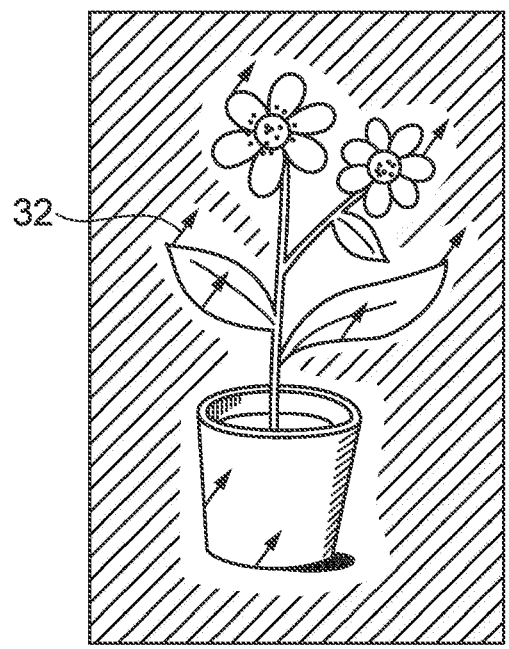
Figure 3C:
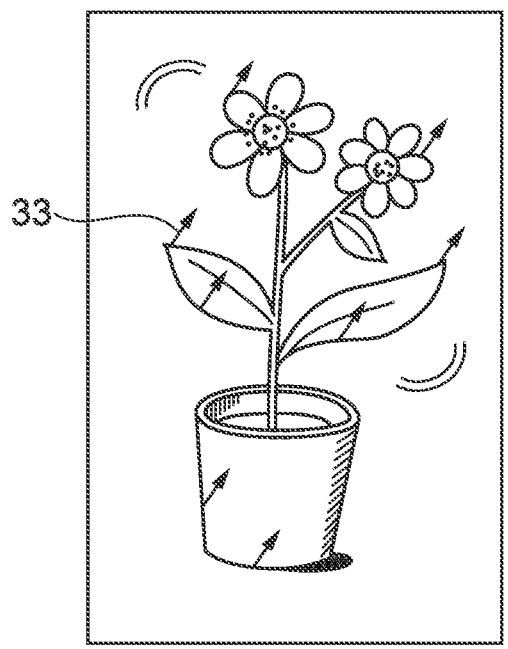

FIGS. 3A to 3C are diagrams useful in explaining the reliability of motion vectors.

FIG. 3A shows motion vectors 31 relatively high in reliability, and FIGS. 3B and 3C show motion vectors 32 and 33 relatively low in reliability.

The photographing environment in FIG. 3B is darker, compared with that in FIG. 3A, and hence the motion vectors 32 are in a state in which the reliability of detectable motion vectors is lower compared with the motion vectors 31. Similarly, although an object is stationary in FIG. 3A, in FIG. 3C, the object is being moved e.g. by handshake or wind, and hence the motion vectors 33 are in a state in which the reliability thereof is lower compared with the motion vectors 31.

Each motion vector is calculated as a movement amount of the feature point between two images as described above with reference to FIG. 2, and hence in a case where the photographing environment is dark and the feature points cannot be properly extracted from such a photographed image as illustrated in FIG. 3B, it is difficult to calculate motion vectors. Therefore, in FIG. 3B, the number of detected motion vectors becomes smaller compared with FIG. 3A, and the motion vectors 32 become lower in reliability than the motion vectors 31.

Further, as shown in FIG. 3C, in a case where the object is being moved by wind, the directions of the motion vectors at respective feature points are different (i.e. the calculated motion vectors are oriented in various directions). In such a photographing environment, the number of motion vectors which substantially match the representative motion vector in the direction and magnitude is smaller, so that the reliability of the motion vectors becomes lower. That is, as dispersion of the calculated motion vectors is larger, the reliability of the motion vectors becomes lower.

In the present embodiment, in a case where the photographing environment is one in which the reliability of motion vectors is low, such as the examples illustrated in FIGS. 3B and 3C, to increase the reliability of motion vectors, the photographing conditions and the developing parameters for acquiring images for calculation of motion vectors and image processing are changed.

In a case where the photographing environment is dark and feature points cannot be properly extracted as in the example in FIG. 3B, the photographing conditions and the developing parameters are changed so as to make it possible to acquire images in a state brighter and higher in contrast. More specifically, for example, the photographing conditions are changed to increase the exposure time period (reduce the acquisition frame rate), and the developing parameters are changed so as to increase at least one of the gain and the contrast at the time of developing acquired images.

In a case where the blur of images used for calculation of motion vectors is large e.g. due to handshake or wind as illustrated in the example in FIG. 3C, when calculating the motion vectors, the photographing conditions, the developing parameters, and image processing are changed so as to enable acquisition of images having a higher sharpness. More specifically, for example, to this end, there is/are employed any of a method of reducing the exposure time period (increasing the acquisition frame rate), a method of increasing the sharpness when developing acquired images, and like other methods. Note that changes made to the photographing conditions when acquiring motion vectors in a case where handshake frequently occurs will be described hereinafter in detail in a second embodiment.

The above description has been given of the method of changing the photographing conditions and image processing when acquiring images used for calculation of motion vectors, but any other method can be employed insofar as the method makes it possible to increase the reliability of motion vectors. For example, image processing performed on images used for calculation of motion vectors and image processing performed for the image alignment and combination may be made different from each other.

For example, in a case where the photographing environment is dark as in the example in FIG. 3B, only when developing the images for calculation of motion vectors, images acquired by the image sensor 6 may be subjected to development by increasing the gain, by increasing the contrast, and/or by like other methods.

Further, when calculating motion vectors, additive combination may be performed. For example, in a case where the photographing environment is dark as in the example in FIG. 3B, instead of calculating the motion vectors with respect to each of acquired images, a plurality of images each obtained by additive combination of two or more images (additively combined image) may be generated to calculate the motion vectors between the additively combined images. By thus using the additively combined images, the apparent exposure time period is increased and hence it is possible to increase the reliability of calculated motion vectors. Further, this apparent exposure time period can be used as the reference in determining the exposure time period applied when actually photographing images to be subjected to the image alignment and combination.

In the present embodiment, it is desirable that detection of the reliability of motion vectors is performed during photographing preparation before actual photographing is performed, i.e. in a so-called live view state. This is because, by calculating the reliability of motion vectors in the live view state, when actually photographing images to be subjected to the image alignment and combination, it is possible to grasp what photographing conditions will make it possible to acquire motion vectors having high reliability and perform the image alignment and combination with high accuracy.

Next, a flow of the control according to the present embodiment will be described with reference to FIGS. 4 to 9.

Figure 4:
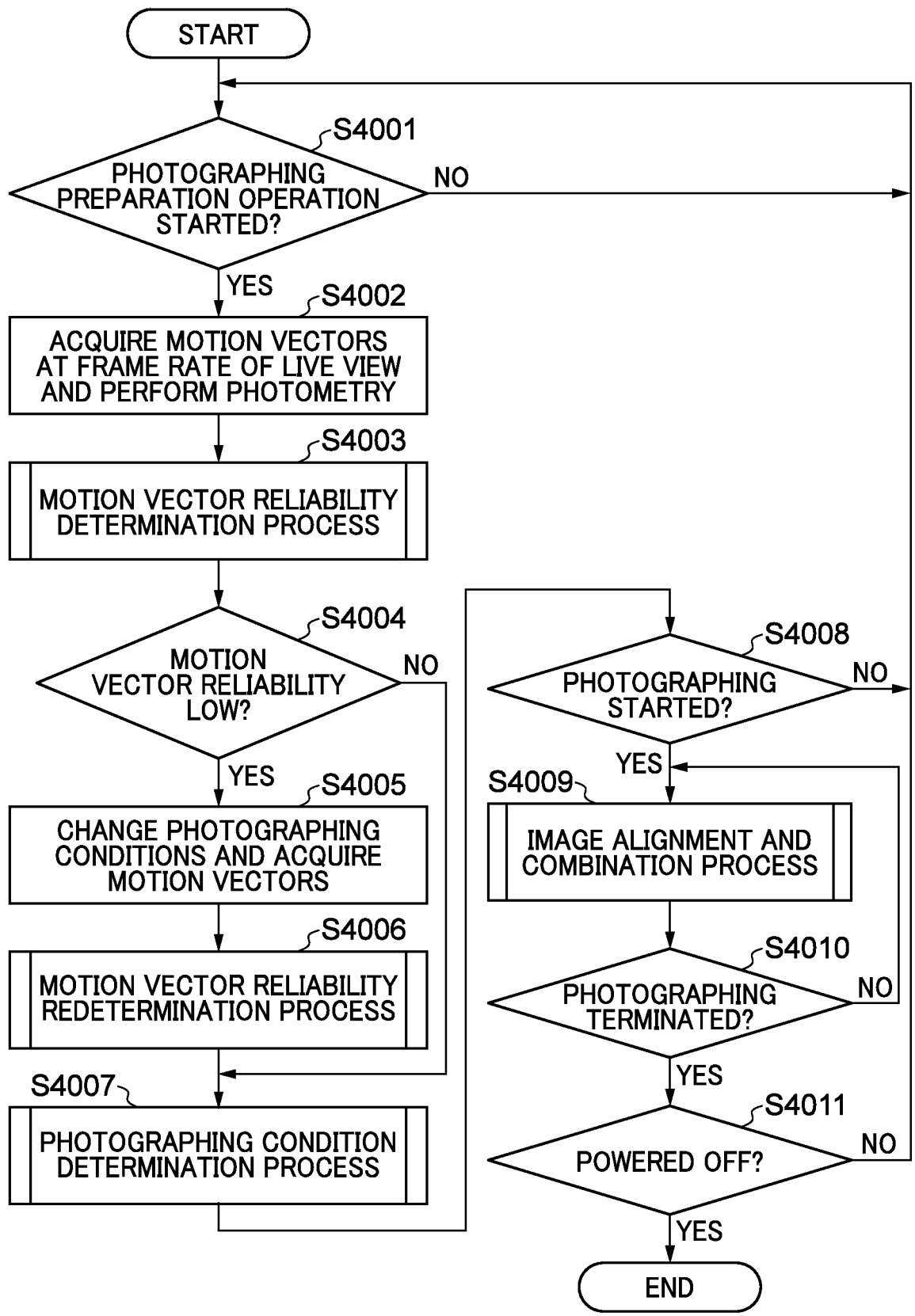
FIG. 4 is a flowchart of a basic control process according to the first embodiment of the present invention.

FIG. 4 is a flowchart of a basic control process according to the present embodiment. The present process is a process that is started when a power button, not shown, of the camera body 1 is operated to power on the image capturing apparatus and is executed by the camera system controller 5 that reads out a program stored in the HDD, not shown.

In a step S4001, the camera system controller 5 determines whether or not the shutter release button, not shown, of the camera body 1 has been half-pressed by a user, and thereby the photographing preparation operation has been started. If it is determined that the photographing preparation operation has been started (YES to the step S4001), the process proceeds to a step S4002, whereas if not (NO to the step S4001), the process remains in the step S4001 until the photographing preparation operation is started.

In the step S4002, the camera system controller 5 controls the photometry section 18 to perform photometry, acquires images at a frame rate of the live view image, which is determined in advance, controls the motion vector calculation section 5a to calculate motion vectors, and proceeds to a step S4003. Although in the present embodiment, calculation of the motion vectors is started when the photographing preparation operation is started, the start timing of calculation of motion vectors is not limited to the timing in the present embodiment insofar as it is before the image alignment and combination is performed. For example, calculation of the motion vector may be started when the image capturing apparatus is powered on.

In the step S4003, the camera system controller 5 performs a motion vector reliability determination process for determining the reliability of the motion vectors calculated in the step S4002 and proceeds to a step S4004. The motion vector reliability determination process will be described hereinafter with reference to FIG. 5.

In the step S4004, the camera system controller 5 determines whether or not the reliability of the motion vectors determined in the step S4003 is lower than a predetermined threshold value. If it is determined that the determined reliability is lower than the predetermined threshold value (YES to the step S4004), the process proceeds to a step S4005, whereas if not (NO to the step S4004), the process proceeds to a step S4007.

In the step S4005, to increase the reliability of motion vectors, the camera system controller 5 changes the photographing conditions and performs photometry and acquisition of images similarly to the step S4002. Then, the camera system controller 5 controls the motion vector calculation section 5a to calculate motion vectors again and then proceeds to a step S4006. The processing for changing the photographing conditions to increase the reliability of motion vector is performed e.g. by using any of the methods described with reference to FIGS. 3A to 3C. For example, there is a case where it is determined that the photographing environment is dark, based on a result of the photometry performed by the photometry section 18, which is acquired in the step S4002. In this case, in the step S4005, for example, there is/are employed any of the method of increasing the gain and contrast when photographing images to be used for calculation of motion vectors, and the method of performing additive combination of a plurality of image photographed in the step S4002 to thereby increasing the apparent exposure time period. Further, there is a case where from the result of the photometry performed by the photometry section 18, which is acquired in the step S4002, it is determined that the photographing environment is light. In this case, in the step S4005, for example, the images to be used for calculation of motion vectors are photographed at a higher frame rate (in a shorter exposure time period) than a frame rate used when the images are acquired in the step S4002.

In the step S4006, the camera system controller 5 performs a motion vector reliability redetermination process for determining the reliability of the motion vectors calculated in the step S4005, updates the current reliability of the motion vectors, and proceeds to the step S4007. The motion vector reliability redetermination process will be described hereinafter with reference to FIG. 6.

In the step S4007, the camera system controller 5 (photographing condition determination unit) performs a photographing condition determination process for determining the exposure time period and the photographing conditions for photographing images to be subjected to the image alignment and combination, according to the current reliability of motion vectors, and proceeds to a step S4008. The photographing condition determination process in the step S4007 will be described hereinafter with reference to FIG. 7. Note that in a case where the process proceeds from the step S4004 directly to the step S4007, the current reliability of motion vectors is calculated in the step S4003, whereas in a case where the process proceeds from the step S4006 to the step S4007, the current reliability of motion vectors is calculated in the step S4006.

In the step S4008, the camera system controller 5 determines whether or not the shutter release button, not shown, of the camera body 1 has been fully pressed by the user, whereby the photographing operation has been started. If it is determined that the photographing operation has been started (YES to the step S4008), the process proceeds to a step S4009, whereas if not (NO to the step S4008), the process returns to the step S4001.

In the step S4009, the camera system controller 5 performs an image alignment and combination process for consecutively photographing a plurality of images under the photographing conditions determined by the photographing condition determination process in the step S4007, aligning the positions of the plurality of obtained images, and combining the images, and proceeds to a step S4010. The image alignment and combination process in the step S4009 will be described hereinafter with reference to FIGS. 8 and 9.

In the step S4010, the camera system controller 5 determines whether or not the photographing operations in the image alignment and combination process in the step S4009 have been terminated. If it is determined that the photographing operations have been terminated (YES to the step S4010), the process proceeds to a step S4011, whereas if not (NO to the step S4010), the process returns to the step S4009.

In the step S4011, the camera system controller 5 determines whether or not the power button, not shown, of the camera body 1 has been operated, whereby the image capturing apparatus has been powered off. If it is determined that the image capturing apparatus has not been powered off (NO to the step S4011), the process returns to the step S4001, whereas if the image capturing apparatus has been powered off (YES to the step S4011), the present process is terminated.

Figure 5:
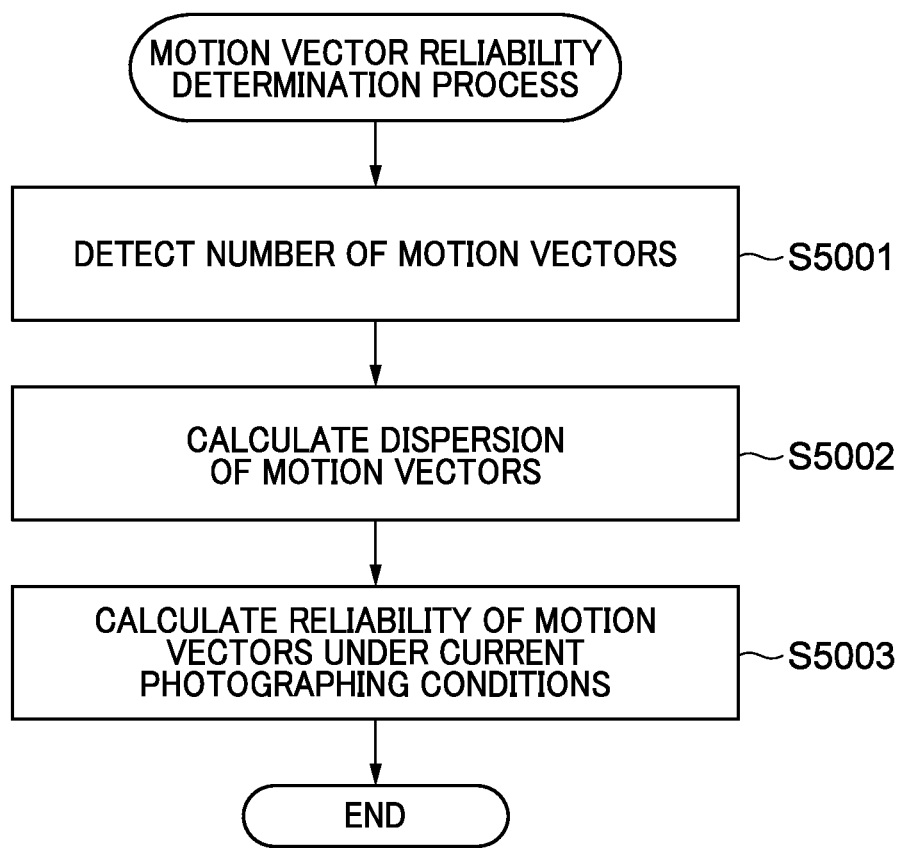
FIG. 5 is a flowchart of a motion vector reliability determination process in a step in FIG. 4.

Next, the motion vector reliability determination process in the step S4003 in FIG. 4 will be described in detail with reference to FIG. 5.

In a step S5001, the camera system controller 5 detects the number of motion vectors calculated by the motion vector calculation section 5a and proceeds to a step S5002. As described with reference to FIG. 2, if the images used for calculating motion vectors are difficult to detect feature points, such as a case where the images are dark, low in contrast, or blurred, the motion vector calculation section 5a cannot calculate motion vectors with high accuracy. As a result, the number of calculated motion vectors sometimes becomes small.

In the step S5002, the camera system controller 5 calculates the dispersion of the motion vectors calculated by the motion vector calculation section 5a and proceeds to a step S5003. The dispersion mentioned here refers to variation in the magnitude and variation in the direction of the motion vectors calculated by the motion vector calculation section 5a. In a case where a lot of motion vectors which are similar in the magnitude and the direction are calculated by the motion vector calculation section 5a, the calculation result in the step S5002 indicates that the dispersion is small. On the other hand, in a case where various motion vectors which are different in the magnitude and the direction are calculated by the motion vector calculation section 5a, the calculation result in the step S5002 indicates that the dispersion is large.

In the step S5003, the camera system controller 5 (reliability calculation unit) consults at least one of the detection result obtained in the step S5001 and the calculation result obtained in the step S5002 to thereby calculate the reliability of the motion vectors under the current photographing conditions, followed by terminating the present process. Basically, as the number of motion vectors is larger, and as the dispersion of motion vectors is smaller, the reliability of the motion vectors, which is calculated in the step S5003, is higher.

Figure 6:
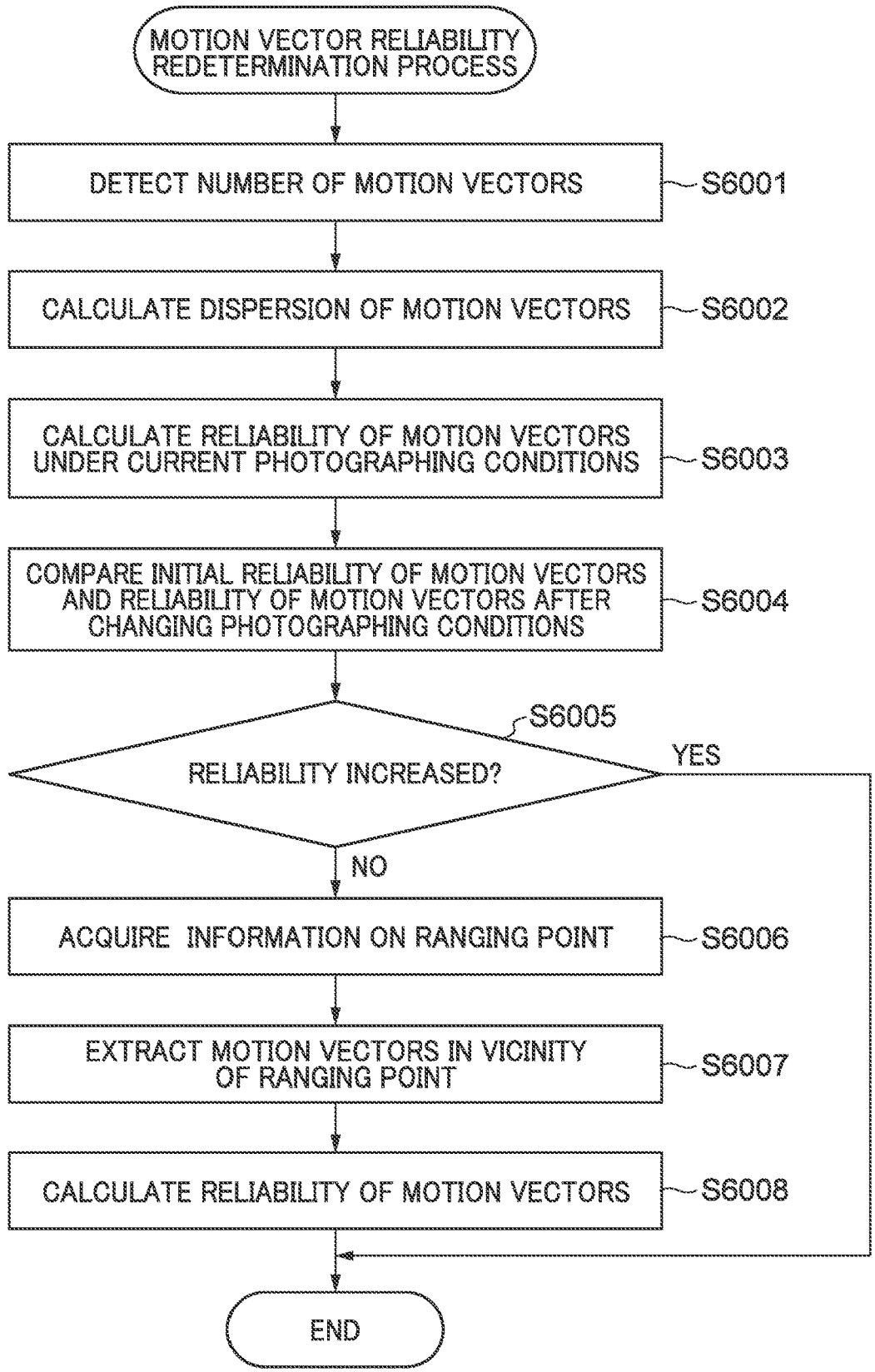
FIG. 6 is a flowchart of a motion vector reliability redetermination process in a step in FIG. 4.

Next, the motion vector reliability redetermination process in the step S4006 will be described in detail with reference to FIG. 6.

In a step S6001, the camera system controller 5 detects the number of motion vectors calculated by the motion vector calculation section 5a and proceeds to a step S6002. As described with reference to FIG. 2, if the images used for calculating the motion vectors are difficult to detect feature points, such as a case where the images are dark, low in contrast, or blurred, the motion vector calculation section 5a cannot calculate motion vectors with high accuracy. As a result, the number of the calculated motion vectors is sometimes small.

In the step S6002, the camera system controller 5 calculates the dispersion of the motion vectors calculated by the motion vector calculation section 5a and proceeds to a step S6003. The dispersion mentioned here refers to variation in the magnitude and variation in the direction of the motion vectors calculated by the motion vector calculation section 5a. In a case where a lot of motion vectors which are similar in the magnitude and the direction have been calculated by the motion vector calculation section 5a, the calculation result in the step S6002 indicates that the dispersion is small. On the other hand, in a case where various motion vectors which are different in the magnitude and the direction have been calculated by the motion vector calculation section 5a, the calculation result in the step S6002 indicates that the dispersion is large.

In the step S6003, the camera system controller 5 consults at least one of the detection result obtained in the step S6001 and the calculation result obtained in the step S6002 to thereby calculate the reliability of the motion vectors under the current photographing conditions, and proceeds to a step S6004. Basically, as the number of motion vectors is larger, and as the dispersion of motion vectors is smaller, the reliability of the motion vectors, calculated in the step S6003, is higher.

In the step S6004, the camera system controller 5 compares the initial reliability of the motion vectors, calculated in the step S4003, and the reliability of the motion vectors after changing the photographing conditions, calculated in the step S6003, and proceeds to a step S6005.

In the step S6005, the camera system controller 5 determines, based on the comparison in the step S6004, whether or not the reliability of the motion vectors has increased from the initial reliability after changing the photographing conditions. As a result of this determination, if the reliability of the motion vectors has not increased from the initial reliability after changing the photographing conditions (NO to the step S6005), the process proceeds to a step S6006. On the other hand, if the reliability of the motion vectors has increased from the initial reliability after changing the photographing conditions (YES to the step S6005), the present process is terminated.

In the step S6006, the camera system controller 5 acquires information on a ranging point (position where focus is achieved within the screen) (hereinafter referred to as the "ranging point information") referred to when focus is achieved by adjusting part of the photographing optical system 3, and proceeds to a step S6007.

In the step S6007, the camera system controller 5 extracts motion vectors in the vicinity of the ranging point based on the ranging point information acquired in the step S6006 and proceeds to a step S6008.

In the step S6008, the camera system controller 5 calculates the reliability of the motion vectors extracted in the step S6007, followed by terminating the present process.

For example, in a case where an object low in contrast and less in the number of feature points, such as the sky, occupies a lot in the screen acquired in the step S4005, even when the photographing conditions are changed in the step S4005, the reliability of the motion vectors is not necessarily increased but sometimes becomes worse. Therefore, in a case where the reliability of the motion vectors is not increased even after the photographing conditions are changed, by executing the steps S6006 to S6008, the reliability of the motion vectors to be referred to when performing the photographing condition determination process in the step S4007 is determined. In a case where an object which is difficult to acquire motion vectors, such as the sky, occupies a lot in the screen, the camera system controller 5 extracts motion vectors not from the whole screen, but from the vicinity of the ranging point where focus is achieved, and calculates the reliability of the extracted motion vectors. As the number of the motion vectors in the vicinity of the ranging point is larger than the number of the motion vectors detected in the step S6001, the reliability of the motion vectors in the vicinity of the ranging point, calculated in the step S6008, becomes higher than the value calculated in the step S6003. Further, as the dispersion of the motion vectors in the vicinity of the ranging point is smaller than the dispersion calculated in the step S6002, the reliability of the motion vectors in the vicinity of the ranging point, calculated in the step S6008, becomes higher than the value calculated in the step S6003.

Next, the photographing condition determination process in the step S4007 will be described in detail with reference to a flowchart in FIG. 7.

In a step S7001, the camera system controller 5 refers to the reliability of the motion vectors calculated by the motion vector calculation section 5a, the photographing conditions of the images used for calculation of the motion vectors, and the photometry result acquired in the step S4002, and proceeds to a step S7002. In a case where the above-mentioned additively combined images are to be generated, the photographing conditions mentioned here include the number of images to be additively combined (added image number).

In the step S7002, the camera system controller 5 determines the exposure time period and the photographing conditions of images to be photographed in the image alignment and combination process in the step S4009, based on the information referred to in the step S7001, followed by terminating the present process.

For example, there is a case where it is predictable from the information referred to in the step S7001 that although the photographing environment is dark, if the photographing conditions are changed to increase the gain of images used for calculation of motion vectors from the initial setting, the reliability of motion vectors will be increased. In this case, the photographing conditions are determined in the step S7002, such that the gain is increased for only images to be used for calculation of the motion vectors, out of images photographed for the image alignment and combination process. In the image alignment and combination process, according to the motion vectors calculated using the images developed with the increased gain, images developed with the normal gain are aligned and combined. With this, it is possible to obtain an image less affected by handshake.

Further, there is a case where it is predictable from the information referred to in the step S7001 that the reliability of motion vectors is increased by using additively combined images. In this case, the photographing conditions are determined in the step S7002 such that the additively combined images are generated from images photographed for the image alignment and combination process. In the image alignment and combination process, the motion vectors are calculated using the thus generated additively combined images. With this, it is possible to obtain an image less affected by handshake.

On the other hand, there is a case where it is predictable from the information referred to in the step S7001 that if the photographing environment is bright and the photographing conditions are set such that the exposure time period of images used for calculation of motion vectors is made shorter than the initial setting, the reliability of motion vectors is increased. In this case, in the step S7002, the photographing conditions are determined such that the exposure time period for photographing each of images for the image alignment and combination process is reduced.

As described above, the exposure time period and the photographing conditions for photographing images for the image alignment and combination process are determined with reference to the information referred to in the step S7001.

Further, in the step S7002, the photographing conditions of images used for the image alignment and combination process may be determined according to the performance of one or both of the camera-side blur correction section 14 provided in the camera body 1 and the lens-side blur correction section 13 provided in the lens barrel 2.

The operation of blur correcting means sometimes changes between a photographing preparation time and an actual photographing time (time of photographing for the image alignment and combination process). For this reason, it is preferable to determine the photographing conditions for photographing images for the image alignment and combination process, by taking a difference in the blur correction performance between the photographing preparation time and the actual photographing time into consideration. For example, the blur correction performance of the blur correcting means becomes higher at the actual photographing time than at the photographing preparation time, and hence the exposure time period can be set longer (since an image blur is difficult to be generated even when the exposure time period is made longer at the actual photographing time than at the photographing preparation time).

A specific method of operating the blur correcting means is determined according to each of the respective types of the camera body 1 and the lens barrel 2 or a combination of these. Therefore, it is preferable to refer to the blur correction performance at the photographing preparation time and the actual photographing time as well in the step S7001 and then determine the photographing conditions in the step S7002.

Next, the image alignment and combination process in the step S4009 in FIG. 4 will be described in detail with reference to FIGS. 8 and 9.

Figure 8:
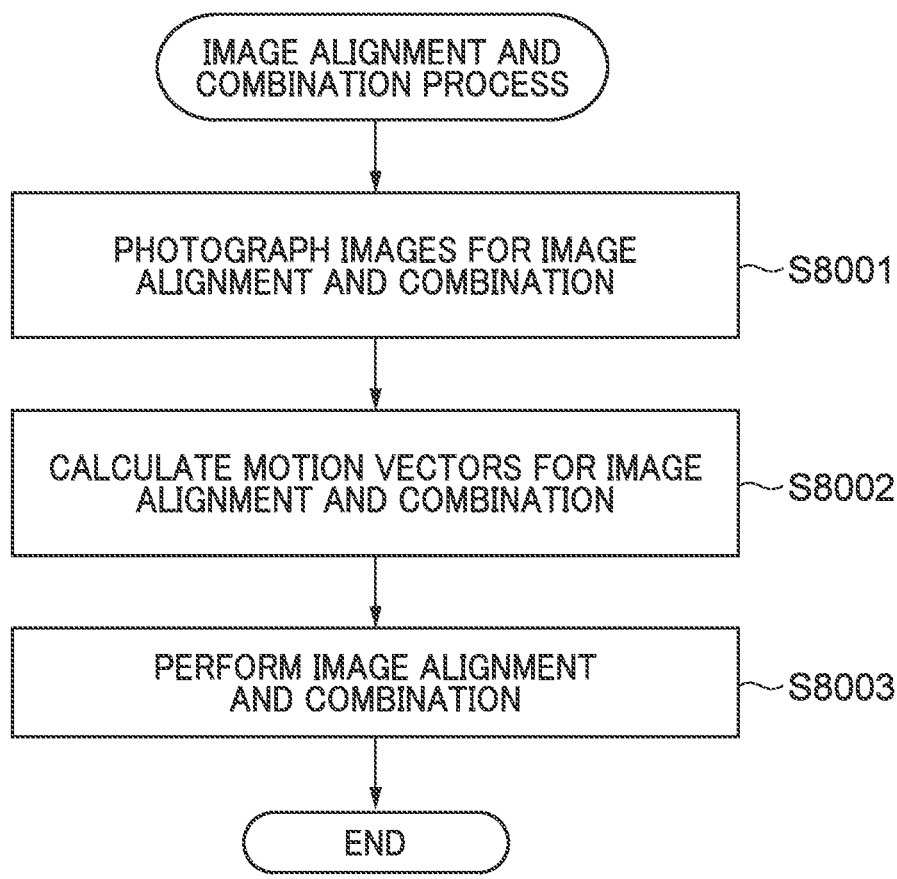
FIG. 8 is a flowchart of an image alignment and combination process in a step in FIG. 4.
Figure 9:
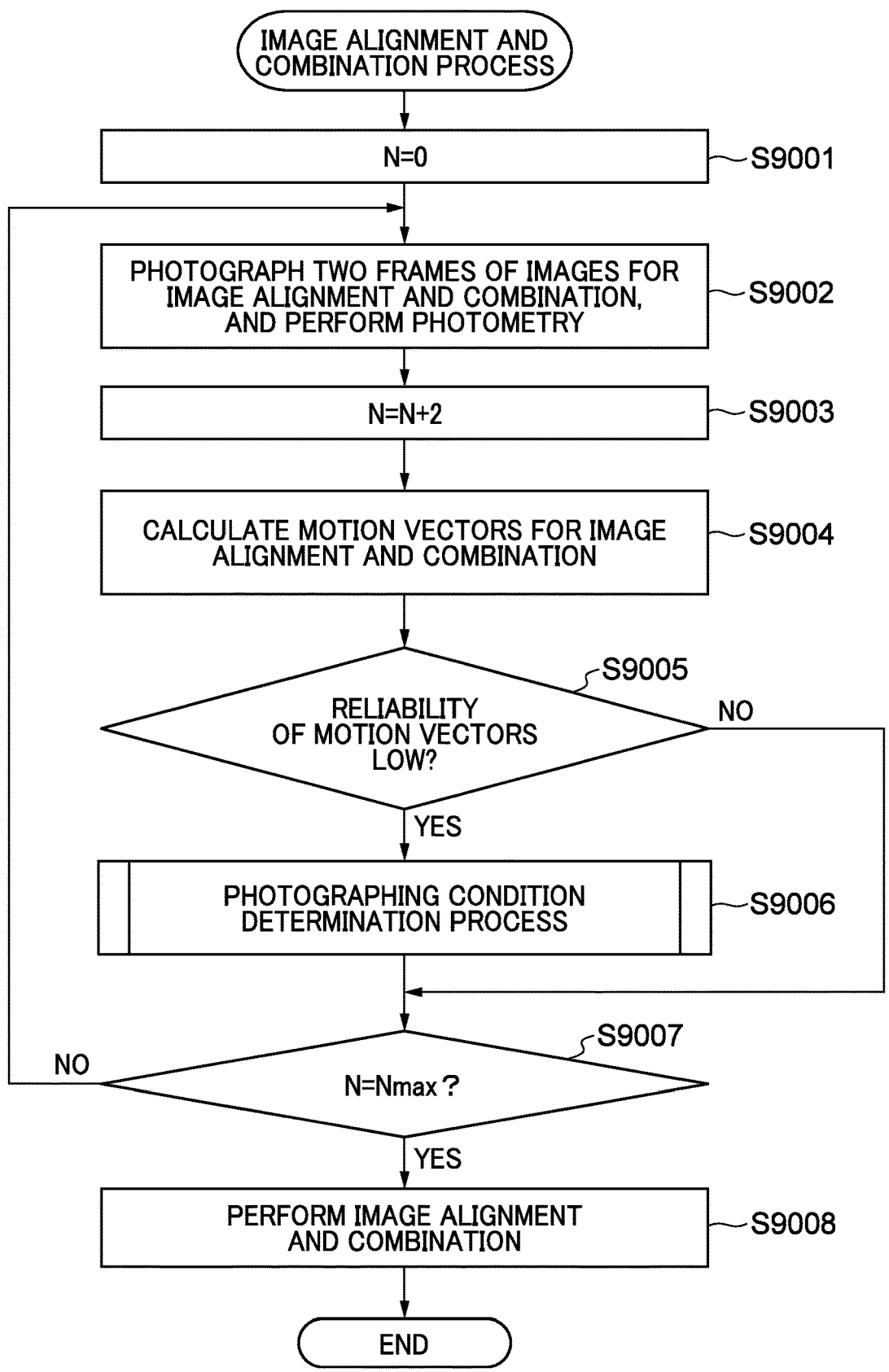
FIG. 9 is a flowchart of a variation of the image alignment and combination process in the step in FIG. 4.

FIGS. 8 and 9 are basically the same processes. However, in FIG. 8, photographing of all images for the image alignment and combination is performed with the exposure time period and the photographing conditions determined in the photographing condition determination process in the step S4007. On the other hand, in FIG. 9, in parallel with consecutive photographing of images for the image alignment and combination, whenever an image of one frame is photographed, motion vectors are sequentially calculated to determine the reliability of the calculated motion vectors and the photographing conditions are changed according to a result of the determination.

First, the image alignment and combination process in FIG. 8 will be described.

Referring to FIG. 8, in a step S8001, the camera system controller 5 photographs all images for the image alignment and combination, which are consecutive on a time-series basis, with the exposure time period and the photographing conditions determined in the photographing condition determination process in the step S4007, and proceeds to a step S8002.

In the step S8002, the camera system controller 5 controls the motion vector calculation section 5a to calculate motion vectors from the images acquired in the step S8001 and proceeds to a step S8003.

In the step S8003, the camera system controller 5 controls the image combining section 5b to perform the image alignment and combination for all of the images acquired in the step S8001 based on the motion vectors calculated in the step S8002, followed by terminating the present process.

In the step S8002, basically, as the images for calculating motion vectors, it is advantageous to directly use images photographed in the step 8001, for reducing the processing time and the processing load. However, the method of calculating motion vectors is not limited to this. For example, as described with reference to FIG. 2 and FIGS. 3A to 3C, there may be employed the method of changing the gain and the contrast at the time of developing acquired images or the method of additively combining images used for calculation of motion vectors and calculating the motion vectors using the generated additively combined images.

Next, a variation of the image alignment and combination process will be described with reference to FIG. 9.

Referring to FIG. 9, first, in a step S9001, the camera system controller 5 sets a photographed frame number N of the images for the image alignment and combination to an initial value of 0 and proceeds to a step S9002.

In the step S9002, similar to the step S8001 in FIG. 8, the camera system controller 5 photographs images for the image alignment and combination. However, differently from FIG. 8, in this step, only two frames of images to be used this time for the calculation of motion vectors in a step S9004, described hereinafter, are photographed. Note that in a case where additively combined images are used for calculation of motion vectors, a number of frames of images are photographed which is twice the number of images to be added.

In a step S9003, the camera system controller 5 increments the photographed frame number N by two and proceeds to the step S9004. Note that in a case where additively combined images are used for calculation of motion vectors, the photographed frame number N is incremented by the number of frames twice the number of images to be added.

In the step S9004, similar to the step S8002 in FIG. 8, the camera system controller 5 calculates motion vectors using the images of the two consecutive frames photographed in the step S9002 and proceeds to a step S9005. Note that in a case where additively combined images are used for calculation of motion vectors, first, two additively combined images are generated from the images photographed in the step S9002 and the motion vectors are calculated using these two additively combined images thus generated.

In the step S9005, similar to the step S4004 in FIG. 4, the camera system controller 5 determines whether or not the reliability of the motion vectors calculated in the step S9004 is lower than a predetermined threshold value. If it is determined that the reliability is lower than the predetermined threshold value (YES to the step S9005), the process proceeds to a step S9006, whereas if not (NO to the step S9005), the process proceeds to a step S9007.

Figure 7:
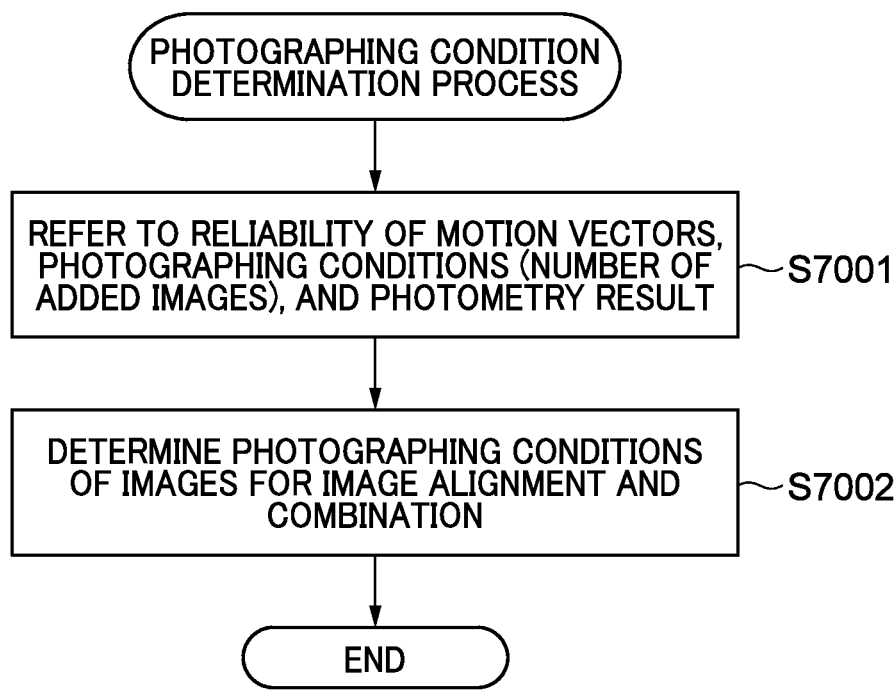
FIG. 7 is a flowchart of a photographing condition determination process in a step in FIG. 4.

In the step S9006, similar to the step S4007 in FIG. 4, the camera system controller 5 executes the photographing condition determination process in FIG. 7 for determining the photographing conditions of the images for the image alignment and combination, updates the currently set exposure time period and photographing conditions, and proceeds to the step S9007. Note that in the photographing condition determination process executed in this step, reference is made to a photometry result and photographing conditions in the step S9002 and the reliability of the motion vectors determined in the step S9005.

In the step S9007, the camera system controller 5 determines whether or not the photographed frame number N has reached the all-frame number Nmax. If it is determined that the photographed frame number N has reached the all-frame number Nmax (YES to the step S9007), the process proceeds to a step S9008. On the other hand, if not (NO to the step S9007), the process returns to the step S9002, wherein the camera system controller 5 photographs two frames of images for the image alignment and combination, which are to be used for the next calculation of motion vectors, with the currently set exposure time period and photographing conditions.

In the step S9008, the camera system controller 5 controls the image combining section 5b to align the positions of the frames of the images photographed in the step S9002, based on the motion vectors of the frames, which have been calculated in the step S9004, and combine the images, followed by terminating the present process.

As described above, by referring to the reliability of the motion vectors, the exposure time period and the photographing conditions of the images for the image alignment and combination, and the photometry result obtained by the photometry section 18, it is possible to accurately acquire the motion vectors irrespective of a difference of the photographing environment, such as a dark environment and a large handshake. Further, by using thus acquired motion vectors, it is possible to accurately perform blur correction by performing image alignment and combination.

An image capturing apparatus according to a second embodiment of the present invention will be described below with reference to FIGS. 10 to 13.

In the conventional technique disclosed in "Handheld Mobile Photography in Very Low Light", an angular shake and a translational shake are collectively evaluated as one shake. Therefore, an image capturing apparatus that is capable of properly optically correcting an angular shake has a problem that when photographing images for the image alignment and combination, the exposure time period is made shorter than necessary, which unnecessarily increases noise.

The present embodiment aims to provide a solution to this problem, and blur correction is performed while minimizing increase in noise by determining the exposure time period of images based on a translational one of shakes.

In the following description, the same hardware components as those of the first embodiment are denoted by the same reference numerals and the redundant description is omitted.

Figure 10:
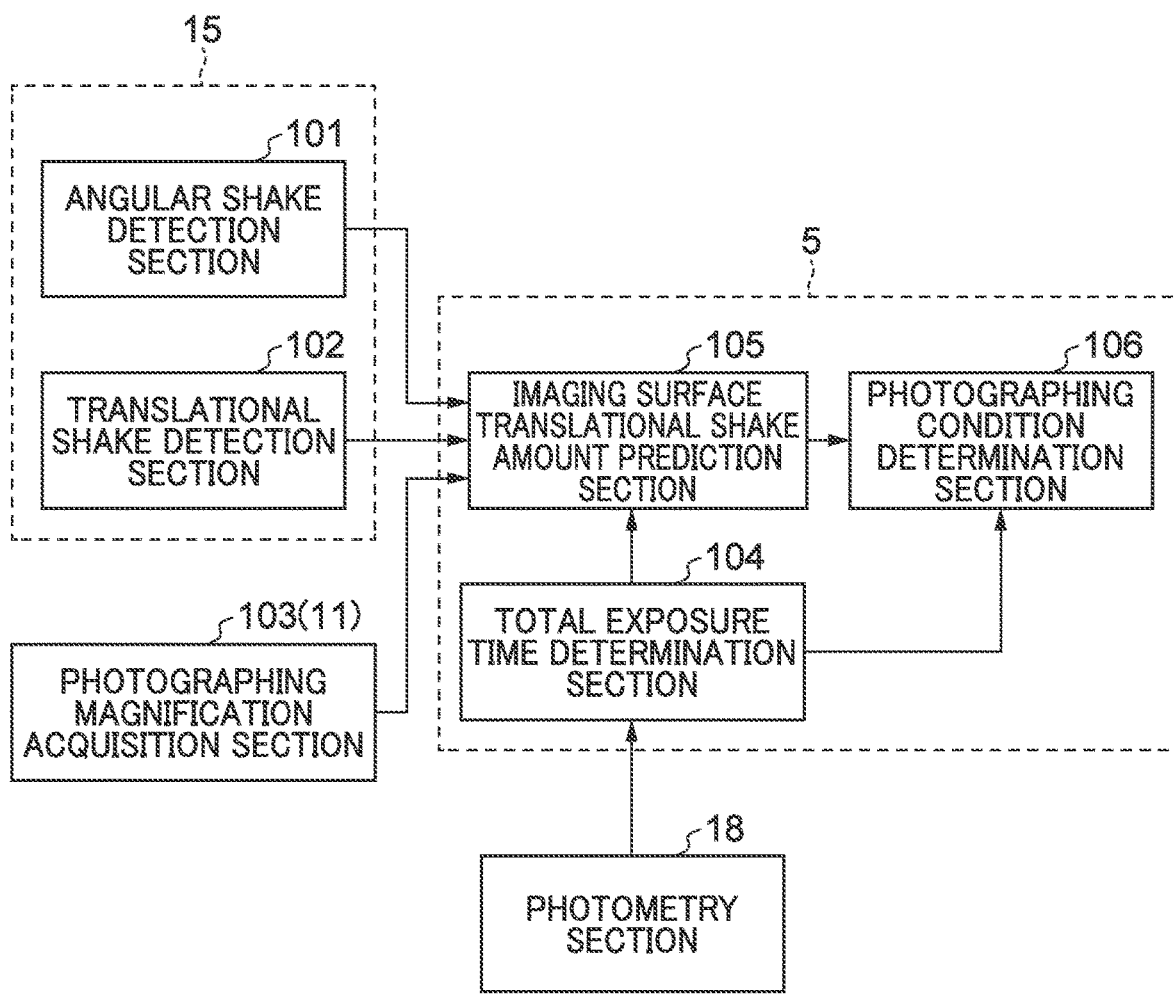
FIG. 10 is a block diagram showing an electrical configuration for determining an exposure time period and photographing conditions of an image of each frame to be photographed for the image alignment and combination process in a second embodiment of the present invention.

FIG. 10 is a block diagram showing an electrical configuration for determining the exposure time period and the photographing conditions of frames of images photographed for the image alignment and combination process in the present embodiment.

As shown in FIG. 10, the camera system controller 5 includes not only the motion vector calculation section 5a and the image combining section 5b (see FIG. 5), but also a total exposure time determination section 104, an imaging surface translational shake amount prediction section 105, and a photographing condition determination section 106. Further, the camera-side shake detection section 15 includes an angular shake detection section 101 and a translational shake detection section 102, and the electrical contact 11 also functions as a photographing magnification acquisition section 103.

The angular shake detection section 101 is provided in the camera-side shake detection section 15 and detects an angular shake applied to the image capturing apparatus. The angular shake detection section 101 is only required to be capable of detecting an angular shake, and is implemented, for example, by a vibration gyroscope (not shown) or the like. The angular shake detection section 101 outputs a detected angular shake to the imaging surface translational shake amount prediction section 105 as an angular speed signal.

The translational shake detection section 102 is provided in the camera-side shake detection section 15 and detects a translational shake applied to the image capturing apparatus. The translational shake detection section 102 is only required to be capable of detecting a translational shake, and is implemented, for example, by an acceleration sensor (not shown) or the like. The translational shake detection section 102 integrates a detected acceleration signal to thereby converts the acceleration signal to a speed signal and outputs the converted speed signal to the imaging surface translational shake amount prediction section 105.

The photographing magnification acquisition section 103 acquires the photographing magnification of the photographing optical system 3 from the lens system controller 12. The photographing magnification acquisition section 103 outputs the acquired photographing magnification to the imaging surface translational shake amount prediction section 105.

The total exposure time determination section 104 is provided in the camera system controller 5 and determines the total exposure time period based on a photometry result obtained by the photometry section 18. However, it is not necessarily required to determine the total exposure time period based on a photometry result, but the total exposure time period may be directly specified by a user. The total exposure time period mentioned here is a total time period calculated by adding up a combined image number (number of frames of images to be consecutively photographed) of exposure time periods for photographing respective frames of images for the image alignment and combination process. The total exposure time determination section 104 outputs the determined total exposure time period to the imaging surface translational shake amount prediction section 105 and the photographing condition determination section 106.

The imaging surface translational shake amount prediction section 105 is provided in the camera system controller 5 and predicts an amount of a translational shake (hereinafter referred to as the "imaging surface translational shake amount") appearing on the imaging surface during the total exposure time period. More specifically, the imaging surface translational shake amount prediction section 105 predicts a translational shake amount, based on the angular speed signal output from the angular shake detection section 101, the speed signal output from the translational shake detection section 102, a photographing magnification output from the photographing magnification acquisition section 103, and a total exposure time period output from the total exposure time determination section 104. The imaging surface translational shake amount prediction section 105 outputs the predicted imaging surface translational shake amount to the photographing condition determination section 106.

Next, an example of the method of predicting the imaging surface translational shake amount by the imaging surface translational shake amount prediction section 105 will be described.

First, an angular shake amount θ over the total exposure time period is predicted based on the angular speed signal output from the angular shake detection section 101 and the total exposure time period output from the total exposure time determination section 104. For example, the angular shake amount θ is predicted e.g. by integrating the angular speed signal up to immediately before prediction over the total exposure time period.

Next, a rotation radius r is calculated by using an equation (1) based on the angular speed signal output from the angular shake detection section 101 (hereinafter referred to as the angular speed signal ω) and the speed signal output from the translational shake detection section 102 (hereinafter referred to as the speed signal v):

$$r = v/\omega \quad (1)$$

Finally, a predicted amount x of the imaging surface translational shake amount appearing on the imaging surface of the image sensor 6 is calculated by using an equation (2) based on the predicted angular shake amount θ, the calculated rotation radius r, and the photographing magnification output from the photographing magnification acquisition section 103 (hereinafter referred to as the photographing magnification β):

$$x = \theta \times r \times \beta \quad (2)$$

The imaging surface translational shake amount can be predicted from the above, but this is only an example, and the imaging surface translational shake amount may be predicted based on the total exposure time period, the speed signal v, and the photographing magnification β. For example, the imaging surface translational shake amount may be predicted by integrating the speed signal v over the total exposure time period and multiplying the integrated speed signal by the photographing magnification β.

The photographing condition determination section 106 determines the exposure time period for photographing each of images for the image alignment and combination based on the total exposure time period output from the total exposure time determination section 104 and the imaging surface translational shake amount predicted by the imaging surface translational shake amount prediction section 105. At this time, as the predicted imaging surface translational shake amount is smaller, the exposure time period of images is set to be longer, and the number of consecutively photographed images (all-frame number Nmax) is set to be smaller. On the other hand, as the predicted imaging surface translational shake amount is larger, the exposure time period of each image is set to be shorter, and the number of consecutively photographed images (all-frame number Nmax) is set to be larger.

Figure 11:
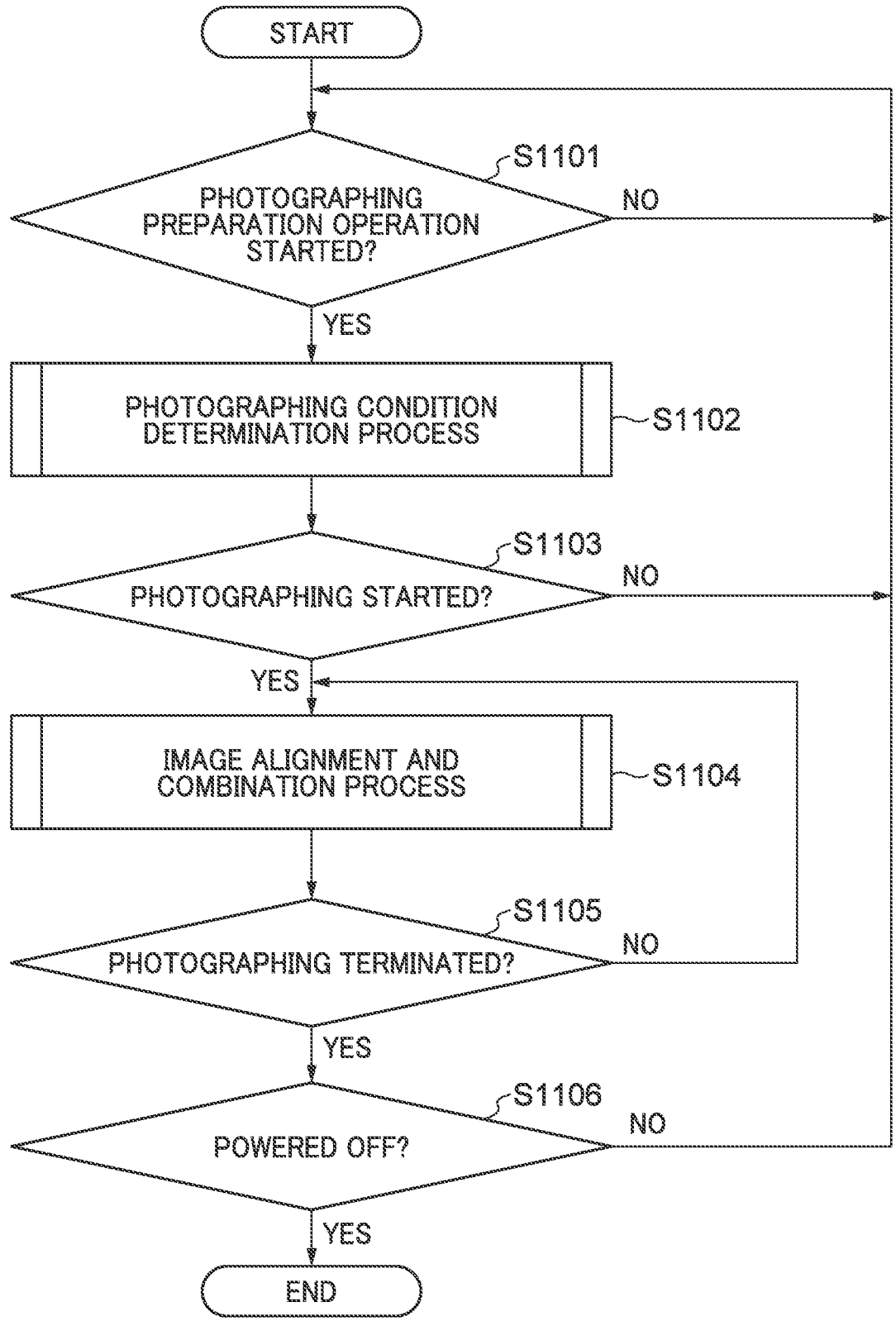
FIG. 11 is a flowchart of a basic control process according to the second embodiment of the present invention.

FIG. 11 is a flowchart of a basic control process according to the present embodiment. The present process is a process started when the power button, not shown, of the camera body 1 is operated to power on the image capturing apparatus, and is executed by the camera system controller 5 that reads out a program stored in the HDD, not shown.

In a step S1101, the camera system controller 5 determines whether or not the shutter release button, not shown, of the camera body 1 has been half-pressed by a user, whereby the photographing preparation operation has been started. If it is determined that the photographing preparation operation has been started (YES to the step S1101), the process proceeds to a step S1102, whereas if not (NO to the step S1101), the process remains in the step S1101 until the photographing preparation operation is started.

In the step S1102, the photographing condition determination section 106 performs a photographing condition determination process for determining the exposure time period and the photographing conditions for photographing images for the image alignment and combination, and proceeds to a step S1103. The photographing condition determination process in the step S1102 will be described hereinafter with reference to FIG. 12.

In the step S1103, the camera system controller 5 determines whether or not the shutter release button, not shown, of the camera body 1 has been fully pressed by the user, and thereby the photographing operation has been started. If it is determined that the photographing operation has been started (YES to the step S1103), the process proceeds to a step S1104, whereas if not (NO to the step S1103), the process returns to the step S1101.

In the step S1104, the camera system controller 5 performs an image alignment and combination process for consecutively photographing a plurality of images, aligning the positions of the plurality of obtained images, and combining the images, and proceeds to a step S1105. The image alignment and combination process in the step S1104 will be described hereinafter with reference to FIGS. 8 and 13.

In the step S1105, the camera system controller 5 determines whether or not the photographing operations in the image alignment and combination process in the step S1104 have been terminated. If it is determined that the photographing operations have been finished (YES to the step S1105), the process proceeds to a step S1106, whereas if not (NO to the step S1105), the process returns to the step S1104.

In the step S1106, the camera system controller 5 determines whether or not the power button, not shown, of the camera body 1 has been operated, whereby the image capturing apparatus has been powered off. If it is determined that the image capturing apparatus has not been powered off (NO to the step S1106), the process returns to the step S1101, whereas if the image capturing apparatus has been powered off (YES to the step S1106), the present process is terminated.

Figure 12:
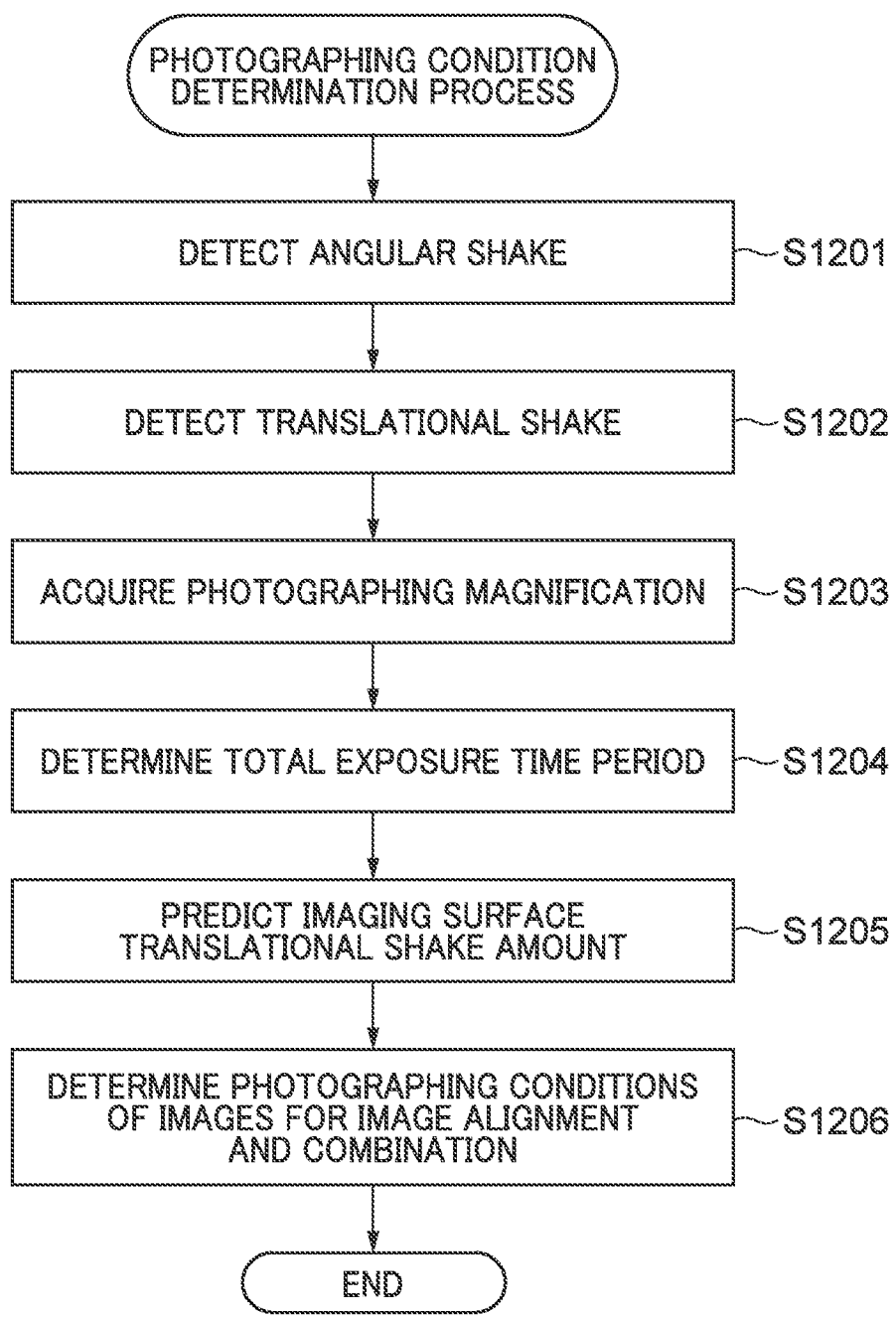
FIG. 12 is a flowchart of a photographing condition determination process in a step in FIG. 11.

Next, the photographing condition determination process in the step S1102 in FIG. 11 will be described with reference to FIG. 12.

In a step S1201, the angular shake detection section 101 detects an angular shake and outputs the detected angular shake to the imaging surface translational shake amount prediction section 105 as an angular speed signal, and then the process proceeds to a step S1202.

In the step S1202, the translational shake detection section 102 detects a translational shake, converts the detected acceleration signal to a speed signal by integrating the acceleration signal, outputs the converted speed signal to the imaging surface translational shake amount prediction section 105, and then the process proceeds to a step S1203.

In the step S1203, the photographing magnification acquisition section 103 acquires the photographing magnification of the photographing optical system 3 from the lens system controller 12 and outputs the acquired photographing magnification to the imaging surface translational shake amount prediction section 105, and then the process proceeds to a step S1204.

In the step S1204, the total exposure time determination section 104 determines the total exposure time period and outputs the determined total exposure time period to the imaging surface translational shake amount prediction section 105 and the photographing condition determination section 106, and then the process proceeds to a step S1205.

In the step S1205, the imaging surface translational shake amount prediction section 105 predicts an imaging surface translational shake amount based on the angular speed signal, the photographing magnification, and the total exposure time period, which have been acquired in the steps S1201, S1203, and S1204, respectively, and the process proceeds to a step S1206.

In the step S1206, the photographing condition determination section 106 determines the exposure time period for photographing each of images for the image alignment and combination based on the total exposure time period and the imaging surface translational shake amount, which have been acquired in the steps S1204 and S1205, respectively, followed by terminating the present process.

Next, the image alignment and combination process in the step S1104 in FIG. 11 will be described in detail with reference to a flowchart in FIG. 13.

Figure 13:
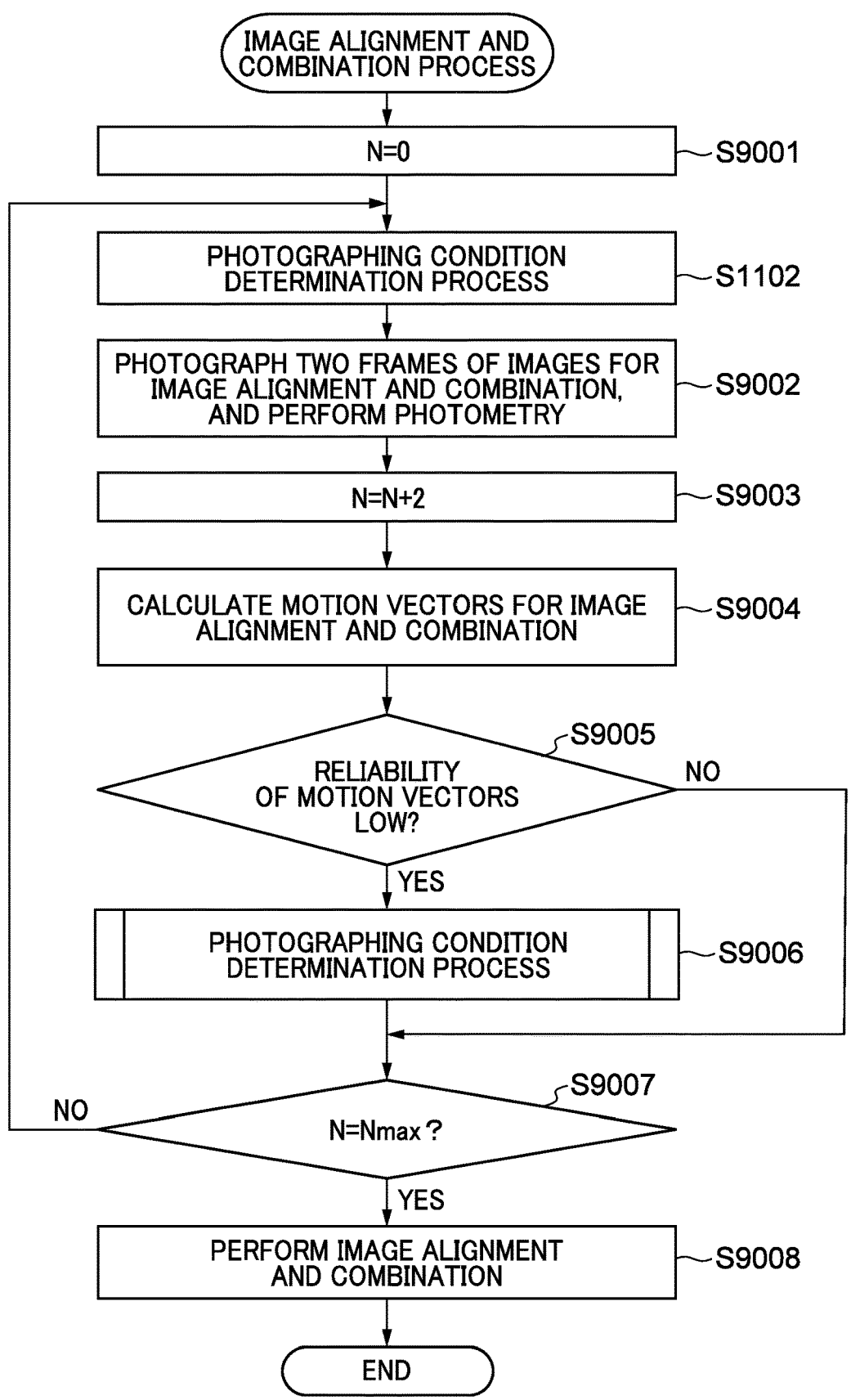
FIG. 13 is a flowchart of an image alignment and combination process in a step in FIG. 11.

FIG. 9 and FIG. 13 are basically the same processes. However, in FIG. 13, the exposure time period is changed based on the total exposure time period and the imaging surface translational shake amount for each of frames of the images for the image alignment and combination. That is, the image alignment and combination process in FIG. 13 differs from the image alignment and combination process in FIG. 9 in that the photographing condition determination process in the step S1102 is executed immediately before the step S9002.

Although in the present embodiment, the case where the angular shake detection section 101 and the translational shake detection section 102 are provided in the camera-side shake detection section 15, the present invention is not limited to this configuration. For example, the angular shake detection section 101 and the translational shake detection section 102 may be provided in the lens-side shake detection section 16, and the angular speed signal and the speed signal may be transmitted to the camera body 1 via the electrical contact 11 as the shake signals. Further, although in the image capturing apparatus according to the present embodiment, the lens barrel 2 is attached to the camera body 1, the lens barrel part and the camera body part may be integrally formed with each other. In this case, the camera-side shake detection section 15 and the lens-side shake detection section 16 may be configured as integrated shake detection means, and the angular shake detection section 101 and the translational shake detection section 102 may be provided in this shake detection means. Note that the shake detection means may be set anywhere within the image capturing apparatus.

Further, the translational shake detection section 102 may detect a translational shake by using the following detection method using a motion vector vect calculated by the motion vector calculation section 5a, a signal c' obtained by differentiating the blur correction amount, and an angular speed signal $\omega$ of an angular shake.

In a case where blur correction is performed by the lens-side blur correction section 13 and/or the camera-side blur correction section 14 when a translational shake is detected, the speed signal v of the translational shake can be calculated by using an equation (3):

$$v = \text{vect} + c' \cdot \omega \qquad (3)$$

Further, in a case where blur correction is not performed when a translational shake is detected, the speed signal v of the translational shake can be calculated by using an equation (4):

$$v = \text{vect} - \omega \qquad (4)$$

As described above, in the image capturing apparatus that is capable of properly performing optical blur correction on an angular shake, the photographing conditions (exposure time period) of each of frames of image of photographed for the image alignment and combination process are determined based on a translational one of shakes. With this, it is possible to prevent the exposure time period of each frame from being made shorter than necessary due to an influence of an angular shake and suppress noise by reducing the number of images to be combined.

Although in the above-described embodiments, the case where the image capturing apparatus is formed by the camera body 1 and the lens barrel 2 has been described, the image capturing apparatus is not limited to this insofar as the image capturing apparatus is a type that performs blur correction when photographing, by driving the image sensor and the photographing optical system. For example, the image capturing apparatus according to the present invention can also be applied to a camera section of a smartphone, a tablet terminal, or the like.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The processor or circuit can include a central processing unit (CPU), a micro processing unit (MPU), a graphics processing unit (GPU), an application specific integrated circuit (ASIC), and a filed programmable gate array (FPGA). Further, the processor or circuit can include a digital signal processor (DSP), a data flow processor (DFP), or a neural processing unit (NPU).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-132368, filed Aug. 16, 2021, which is hereby incorporated by reference herein in its entirety.

What is claimed is:

1. An image capturing apparatus that includes an image sensor, and a photometry unit that performs photometry of a photographing environment, comprising:
    at least one processor; and
    a memory coupled to the at least one processor, the memory having instructions that, when executed by the processor, perform operations as:
    a motion vector calculation section configured to calculate motion vectors based on images acquired by the image sensor;
    a photographing condition determination section configured to determine photographing conditions for consecutively photographing a plurality of images using the image sensor; and
    an image combining section configured to perform image alignment and combination on the plurality of consecutively photographed images,
    wherein the photographing condition determination section changes a gain for developing the consecutively photographed images between a case where the images are used for calculating motion vectors by the motion vector calculation section and a case where the images are used for the image alignment and combination by the image combining section, according to a photometry result obtained by the photometry unit.

2. The image capturing apparatus according to claim 1, wherein the memory having instructions that, when executed by the processor, perform the operations further as a reliability calculation unit configured to calculate a reliability of the motion vectors, and
    wherein the photographing condition determination section determines the photographing conditions according to the photometry result and the reliability calculated by the reliability calculation unit.

3. The image capturing apparatus according to claim 2, wherein the reliability calculation unit calculates the reliability according to the number of motion vectors calculated by the motion vector calculation section from the plurality of images acquired by the image sensor during photographing preparation.

4. The image capturing apparatus according to claim 2, wherein the reliability calculation unit calculates the reliability according to dispersion of motion vectors calculated by the motion vector calculation section from the plurality of images acquired by the image sensor during photographing preparation.

5. The image capturing apparatus according to claim 2, wherein the reliability calculation unit calculates motion vectors from images obtained by additively combining a plurality of images acquired during photographing preparation and calculates the reliability from the calculated motion vectors, according to a brightness of a photographing environment, which is determined based on the photometry result obtained by the photometry unit.

6. The image capturing apparatus according to claim 5, wherein the motion vector calculation section generates a plurality of additively combined images each formed by additively combining two or more images out of the consecutively photographed images and calculates motion vectors between the plurality of the generated additively combined images, and wherein the photographing condition determination section determines the number of images to be additively combined for generating the additively combined images, according to the brightness of the photographing environment, which is determined based on the photometry result obtained by the photometry unit.

7. The image capturing apparatus according to claim 2, wherein the photographing condition determination section sequentially calculates, in parallel with the consecutive photographing, motion vectors from the consecutively photographed images using the motion vector calculation section, and determines photographing conditions for photographing images used for next calculation of motion vectors in the consecutive photographing, according to the reliability of motion vectors calculated by the reliability calculation unit this time in the consecutive photographing, the photographing conditions for photographing the images used for the calculation of motion vectors this time, and the photometry result obtained by the photometry unit.

8. The image capturing apparatus according to claim 2, wherein in a case where the reliability is lower than a predetermined threshold value, the photographing condition determination section changes the photographing conditions for photographing the images used for the calculation of motion vectors or developing parameters or both of the photographing conditions and the developing parameters.

9. The image capturing apparatus according to claim 8, wherein in a case where the reliability is lower than the predetermined threshold value, the photographing condition determination section increases a gain which is one of the developing parameters.

10. The image capturing apparatus according to claim 8, wherein in a case where the reliability is lower than the predetermined threshold value, the photographing condition determination section increases a contrast which is one of the developing parameters.

11. The image capturing apparatus according to claim 6, wherein in a case where the reliability is lower than a predetermined threshold value, the photographing condition determination section changes an exposure time period which is one of the photographing conditions according to the brightness of the photographing environment, which is determined based on the photometry result obtained by the photometry unit.

12. The image capturing apparatus according to claim 1, wherein the memory having instructions that, when executed by the processor, perform the operations further as a blur correction unit configured to correct an image blur by moving at least one of the image sensor and a photographing optical system that causes light from an object to form an image on an imaging surface of the image sensor, and wherein the photographing condition determination section changes the photographing conditions for photographing the images used for the calculation of motion vectors according to performance of the blur correction unit.

13. An image capturing apparatus that includes an image sensor, comprising:
at least one processor; and
a memory coupled to the at least one processor, the memory having instructions that, when executed by the processor, perform operations as:
a translational shake detection section configured to detect a translational shake of the image capturing apparatus to output a speed signal;
a photographing magnification acquisition section configured to acquire a photographing magnification of a photographing optical system that causes light from an object to form an image on an imaging surface of the image sensor;
a total exposure time determination section configured to determine a total exposure time period over which a plurality of images are to be consecutively acquired by the image sensor;
an imaging surface translational shake amount prediction section configured to predict an imaging surface translational shake amount of the image sensor, which is to occur over the total exposure time period, based on the speed signal and the photographing magnification; and
a photographing condition determination section configured to determine an exposure time period of each of frames of the images to be consecutively photographed and the number of the frames of the images to be consecutively photographed, based on the total exposure time period and the imaging surface translational shake amount.

14. The image capturing apparatus according to claim 13, wherein the imaging surface translational shake amount prediction section predicts the imaging surface translational shake amount by multiplying a value obtained by integrating the speed signal over the total exposure time period by the photographing magnification.

15. The image capturing apparatus according to claim 13, wherein as the imaging surface translational shake amount is larger, the photographing condition determination section sets the exposure time period of each of the frames of the images to a shorter time period and the number of consecutively photographed images to a larger value, and as the imaging surface translational shake amount is smaller, the photographing condition determination section sets the exposure time period of each of the frames of the images to a longer time period and the number of consecutively photographed images to a smaller value.

16. A method of controlling an image capturing apparatus that includes an image sensor, and a photometry unit that performs photometry of a photographing environment, comprising:
calculating motion vectors based on images acquired by the image sensor;
determining photographing conditions for consecutively photographing a plurality of images using the image sensor;
performing image alignment and combination on the plurality of consecutively photographed images; and
changing a gain for developing the consecutively photographed images between a case where the images are used for calculating motion vectors and a case where the images are used for the image alignment and combination, according to a photometry result obtained by the photometry unit.

17. A method of controlling an image capturing apparatus that includes an image sensor, comprising:
detecting a translational shake of the image capturing apparatus to output a speed signal;

acquiring a photographing magnification of a photographing optical system that causes light from an object to form an image on an imaging surface of the image sensor;

determining a total exposure time period for consecutively photographing a plurality of images by the image sensor;

predicting an imaging surface translational shake amount of the image sensor, which is to occur over the total exposure time period, based on the speed signal and the photographing magnification; and determining an exposure time period of each of frames of the images to be consecutively photographed and the number of the frames of the images to be consecutively photographed, based on the total exposure time period and the imaging surface translational shake amount.

* * * * *